(12) United States Patent
Mankame et al.

(10) Patent No.: US 12,208,604 B2
(45) Date of Patent: Jan. 28, 2025

(54) INFLATABLES-BASED PROCESS FOR CREATING MULTI-LAYER INTERNAL REINFORCEMENTS

(71) Applicants: GM Global Technology Operations LLC, Detroit, MI (US); The Board of Trustees of the University of Illinois, Urbana, IL (US)

(72) Inventors: Nilesh D. Mankame, Ann Arbor, MI (US); Ruoyu Sun, Champaign, IL (US); Girish Krishnan, Mahomet, IL (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 292 days.

(21) Appl. No.: 17/818,532

(22) Filed: Aug. 9, 2022

(65) Prior Publication Data
US 2024/0051262 A1 Feb. 15, 2024

(51) Int. Cl.
*B32B 5/32* (2006.01)
*B29C 44/12* (2006.01)
(Continued)

(52) U.S. Cl.
CPC .......... *B32B 5/32* (2013.01); *B29C 44/1219* (2013.01); *B29C 44/186* (2013.01); *B29C 44/35* (2013.01);
(Continued)

(58) Field of Classification Search
CPC .... B32B 5/32; B32B 1/08; B32B 5/20; B32B 7/12; B32B 7/370046; B32B 37/15; B32B 2305/022; B32B 2605/00; B29C 44/1219; B29C 44/186; B29C 44/35; B29C 44/18; B29C 44/38; B29C 44/10; B29C 44/1214; B29C 44/128; B62D 29/046;
(Continued)

(56) References Cited

U.S. PATENT DOCUMENTS

| 5,043,114 A | 8/1991 | Saito et al. |
| 5,591,078 A | 1/1997 | Filion et al. |

(Continued)

FOREIGN PATENT DOCUMENTS

| CN | 111941940 A | * 11/2020 |
| DE | 1236176 A | 3/1967 |

(Continued)

OTHER PUBLICATIONS

GE Engineering Structural Foam Design & Processing Guide, GE Plastics, May 1999, pp. 2-97, United States of America.

*Primary Examiner* — Lori Lyjak
(74) *Attorney, Agent, or Firm* — Vivacqua Crane, PLLC

(57) ABSTRACT

A structural component for a vehicle and a process and system for forming the structural component. A first cavity is formed in a first hollow passage between a first bladder and an interior surface of a component forming the structural component. A first structural reinforcement layer is formed in the first cavity by filling the first cavity with a first polymer resin and foaming the first polymer resin to form a first polymer resin foam. A second cavity is formed in the first hollow passage and a second structural reinforcement layer is formed in the second cavity by filling the second cavity with a second polymer resin and foaming the second polymer resin to form a second polymer resin foam.

20 Claims, 18 Drawing Sheets

(51) Int. Cl.
  *B29C 44/18* (2006.01)
  *B29C 44/34* (2006.01)
  *B29L 31/30* (2006.01)
  *B32B 1/08* (2006.01)
  *B32B 5/20* (2006.01)
  *B32B 7/12* (2006.01)
  *B32B 37/00* (2006.01)
  *B32B 37/15* (2006.01)
  *B62D 29/04* (2006.01)

(52) U.S. Cl.
  CPC ............... *B32B 1/08* (2013.01); *B32B 5/20* (2013.01); *B32B 7/12* (2013.01); *B32B 37/0046* (2013.01); *B32B 37/15* (2013.01); *B62D 29/046* (2013.01); *B29L 2031/30* (2013.01); *B32B 2305/022* (2013.01); *B32B 2605/00* (2013.01)

(58) Field of Classification Search
  CPC .... B62D 21/157; B62D 25/04; B62D 29/043; B62D 29/00; B62D 21/03; B62D 21/15; B29L 2031/30; B29L 2031/3005; B60R 13/043; B60R 19/03; B60R 19/205
  See application file for complete search history.

(56) References Cited

U.S. PATENT DOCUMENTS

| | | | | |
|---|---|---|---|---|
| 6,321,793 | B1* | 11/2001 | Czaplicki | B29C 44/18 138/172 |
| 6,419,305 | B1* | 7/2002 | Larsen | B62D 25/04 296/193.06 |
| 6,471,285 | B1* | 10/2002 | Czaplicki | B62D 29/002 296/187.02 |
| 6,729,425 | B2* | 5/2004 | Schneider | B62D 29/002 296/187.02 |
| 6,786,533 | B2* | 9/2004 | Bock | B62D 29/002 296/187.02 |
| 6,923,499 | B2* | 8/2005 | Wieber | B60R 13/0815 296/187.02 |
| 7,169,344 | B2* | 1/2007 | Coon | B29C 44/184 264/263 |
| 9,744,701 | B2* | 8/2017 | Belpaire | B29C 44/581 |
| 10,687,634 | B1* | 6/2020 | Kim | B60N 2/914 |
| 2003/0184121 | A1* | 10/2003 | Czaplicki | B29C 70/745 156/244.14 |
| 2009/0224587 | A1* | 9/2009 | Lawall | B60N 2/6671 297/353 |
| 2014/0239546 | A1* | 8/2014 | Santoni | B62D 23/00 264/265 |
| 2015/0224899 | A1* | 8/2015 | Menne, III | B60N 2/914 297/391 |
| 2016/0332583 | A1* | 11/2016 | Subat | B60R 11/0217 |
| 2019/0106030 | A1* | 4/2019 | Kim | B60N 2/90 |
| 2019/0193373 | A1* | 6/2019 | Alexander | B60N 2/7017 |
| 2019/0195427 | A1* | 6/2019 | Alexander | B32B 7/12 |
| 2020/0156711 | A1* | 5/2020 | Workinger | B29C 70/52 |
| 2023/0339375 | A1* | 10/2023 | Mankame | B60R 22/14 |

FOREIGN PATENT DOCUMENTS

| | | | | |
|---|---|---|---|---|
| DE | 3837221 | A1 | 5/1989 | |
| DE | 3826011 | A1 | 2/1990 | |
| DE | 69627772 | T2 | 2/2004 | |
| EP | 1057608 | A2 * | 12/2000 | ......... B29C 67/0014 |
| EP | 1356911 | A2 | 10/2003 | |
| EP | 1499485 | B1 * | 4/2011 | ............ B29C 44/18 |
| EP | 2570450 | A1 * | 3/2013 | ............ B29C 43/003 |
| EP | 3165430 | A1 * | 5/2017 | ............ B29C 65/48 |
| SE | 509503 | C2 * | 2/1999 | .......... B29C 70/446 |
| WO | WO-9851481 | A1 * | 11/1998 | .......... B29C 70/446 |
| WO | WO-2008077944 | A1 * | 7/2008 | ............ B29C 65/54 |
| WO | WO-2015053377 | A1 * | 4/2015 | ............ B29C 44/08 |
| WO | 2022172257 | A1 | 8/2022 | |

* cited by examiner

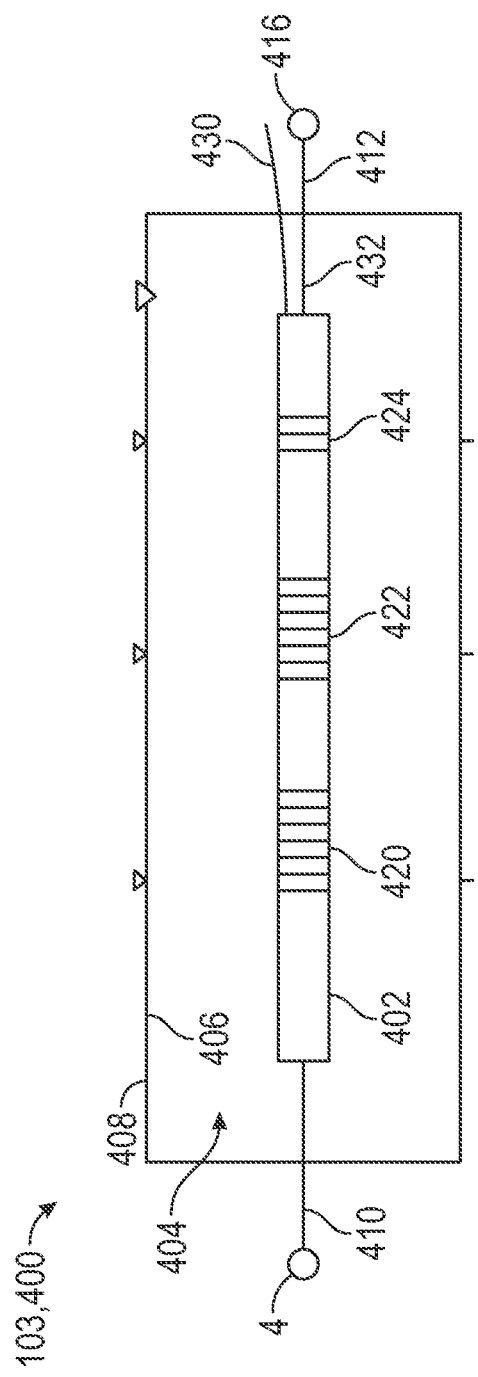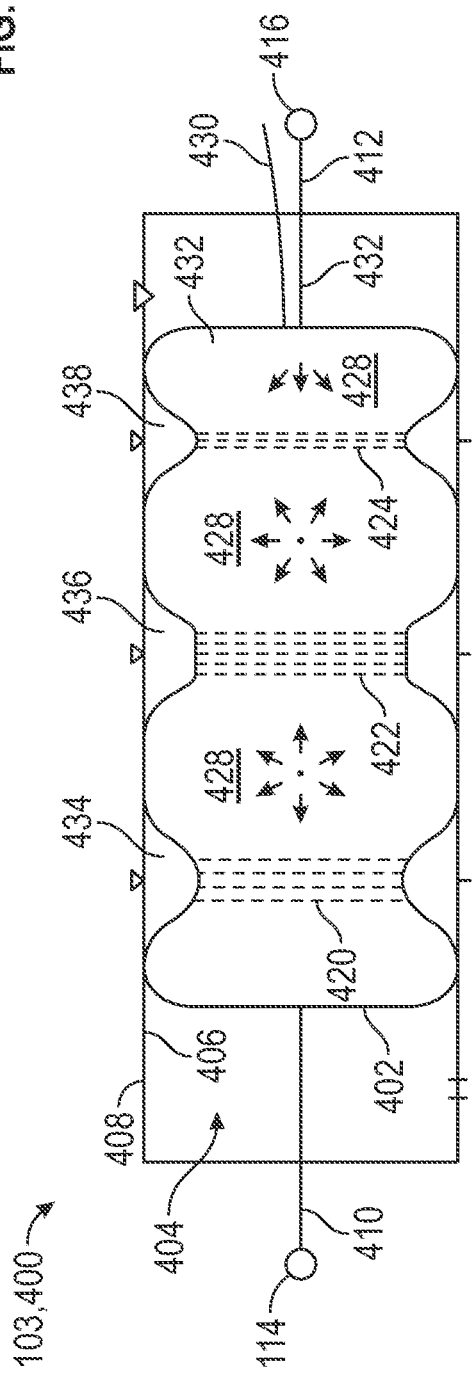
FIG. 4A
FIG. 4B

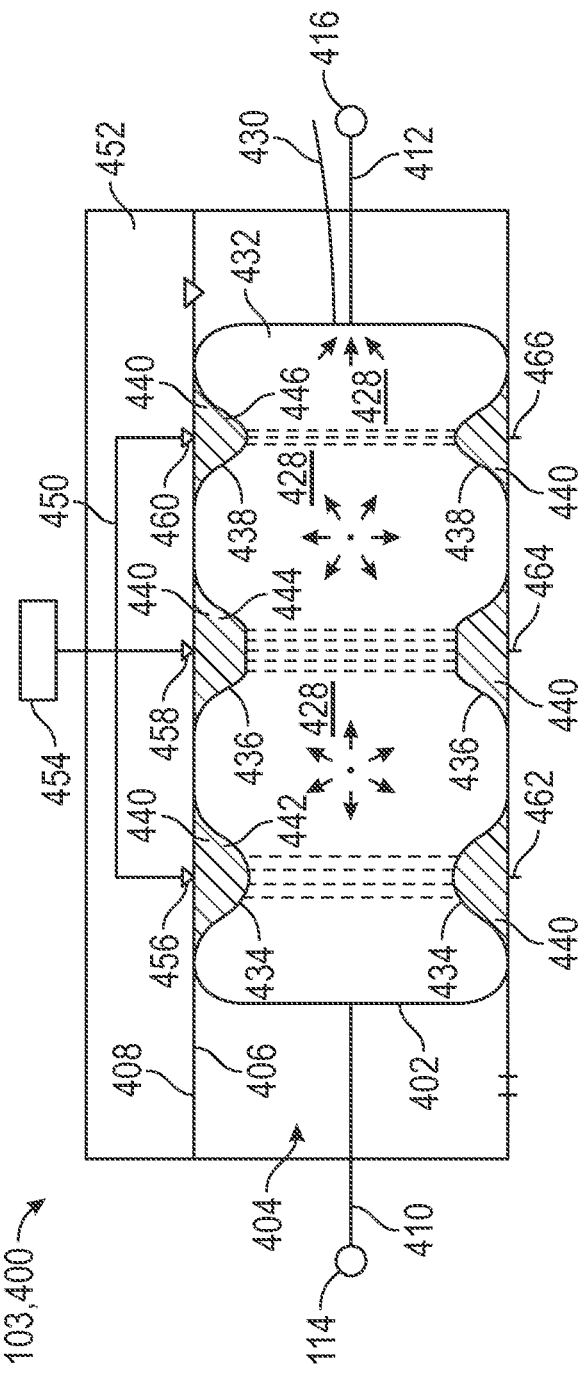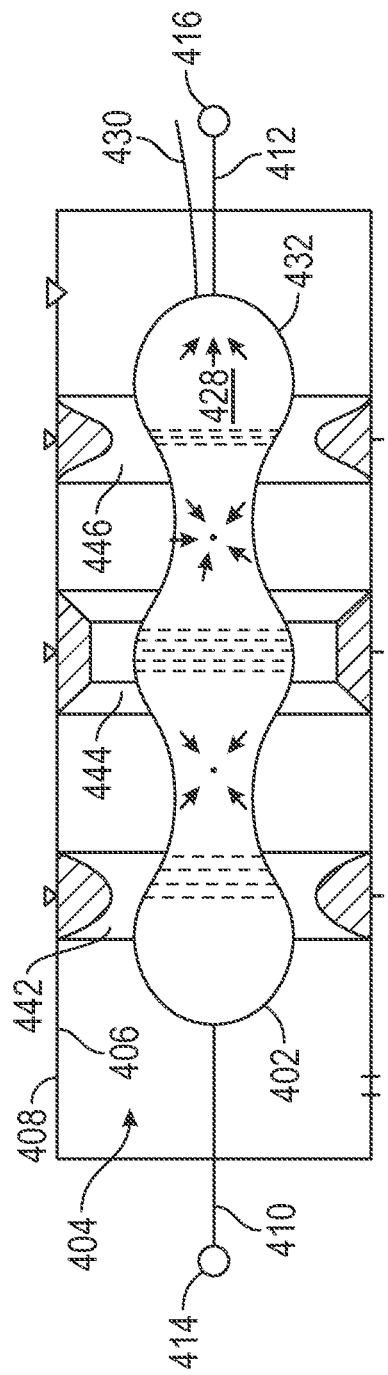

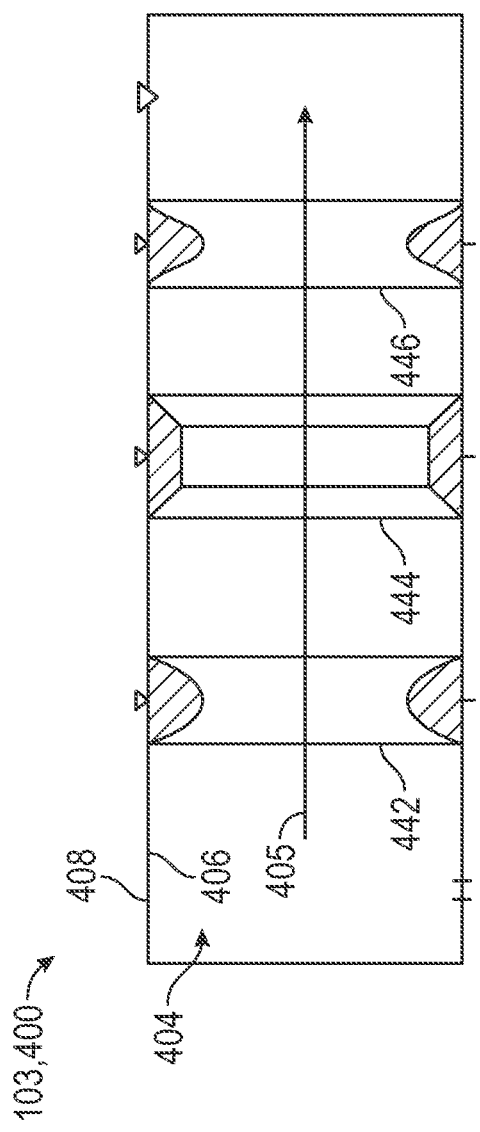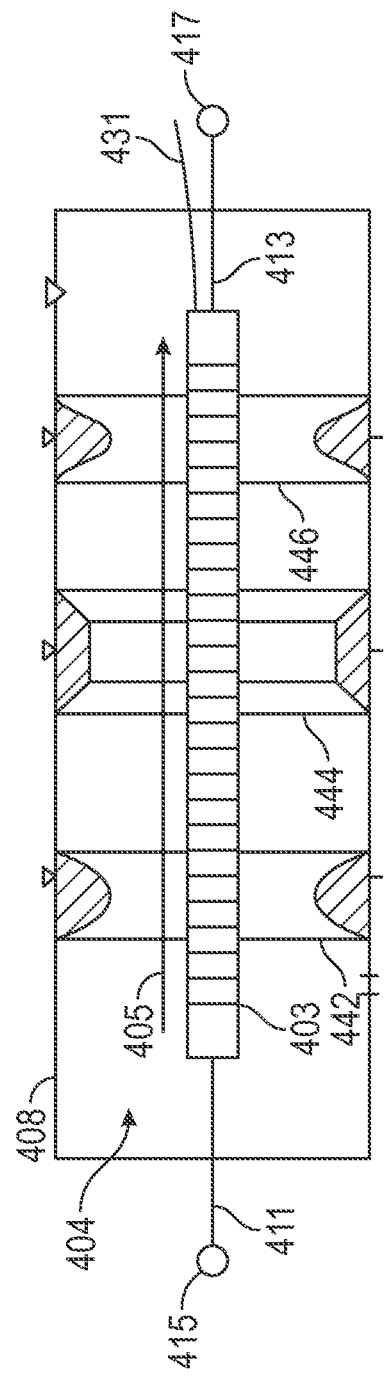
FIG. 4E
FIG. 4F

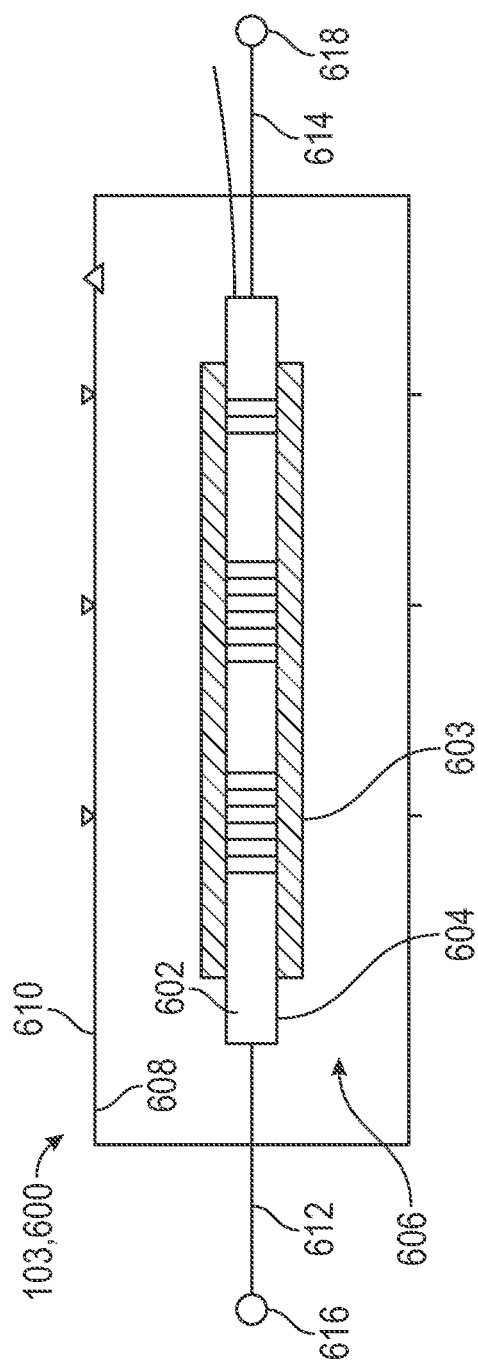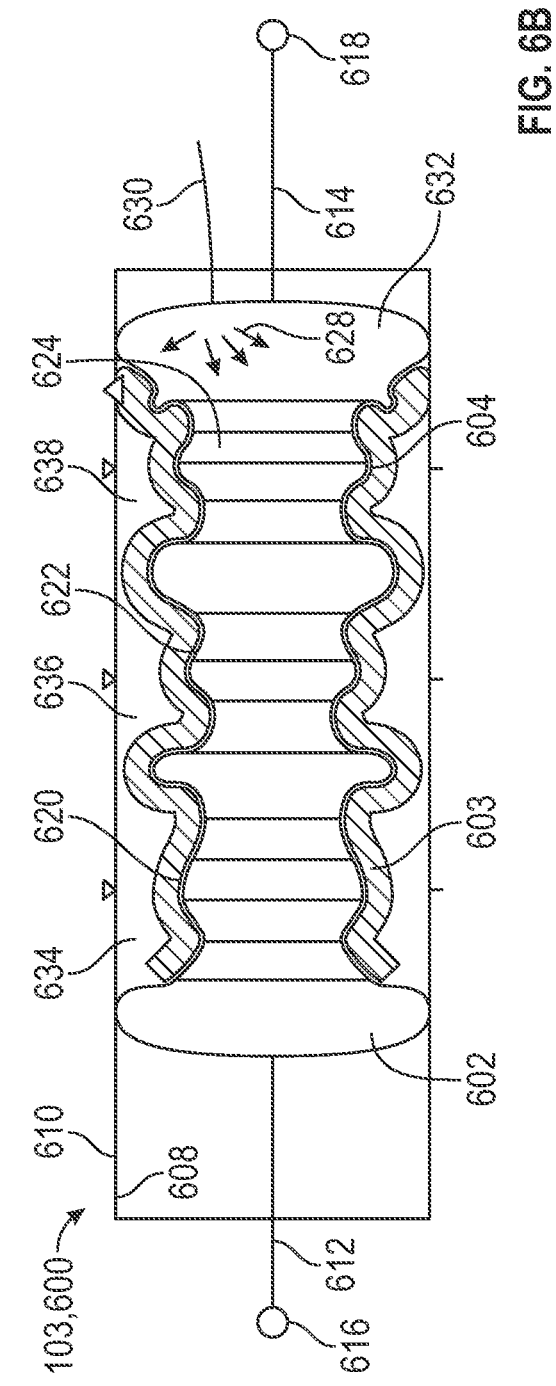

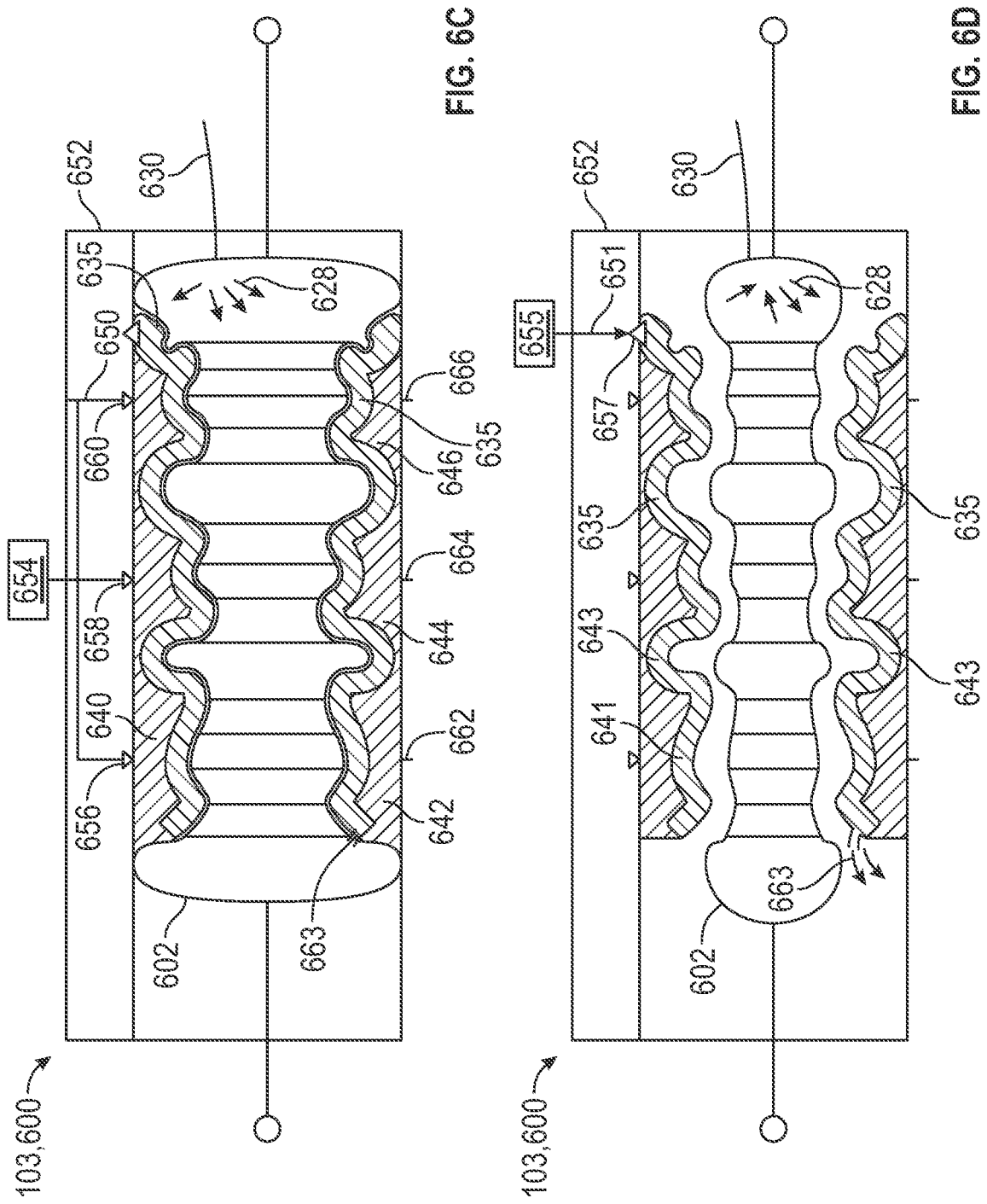

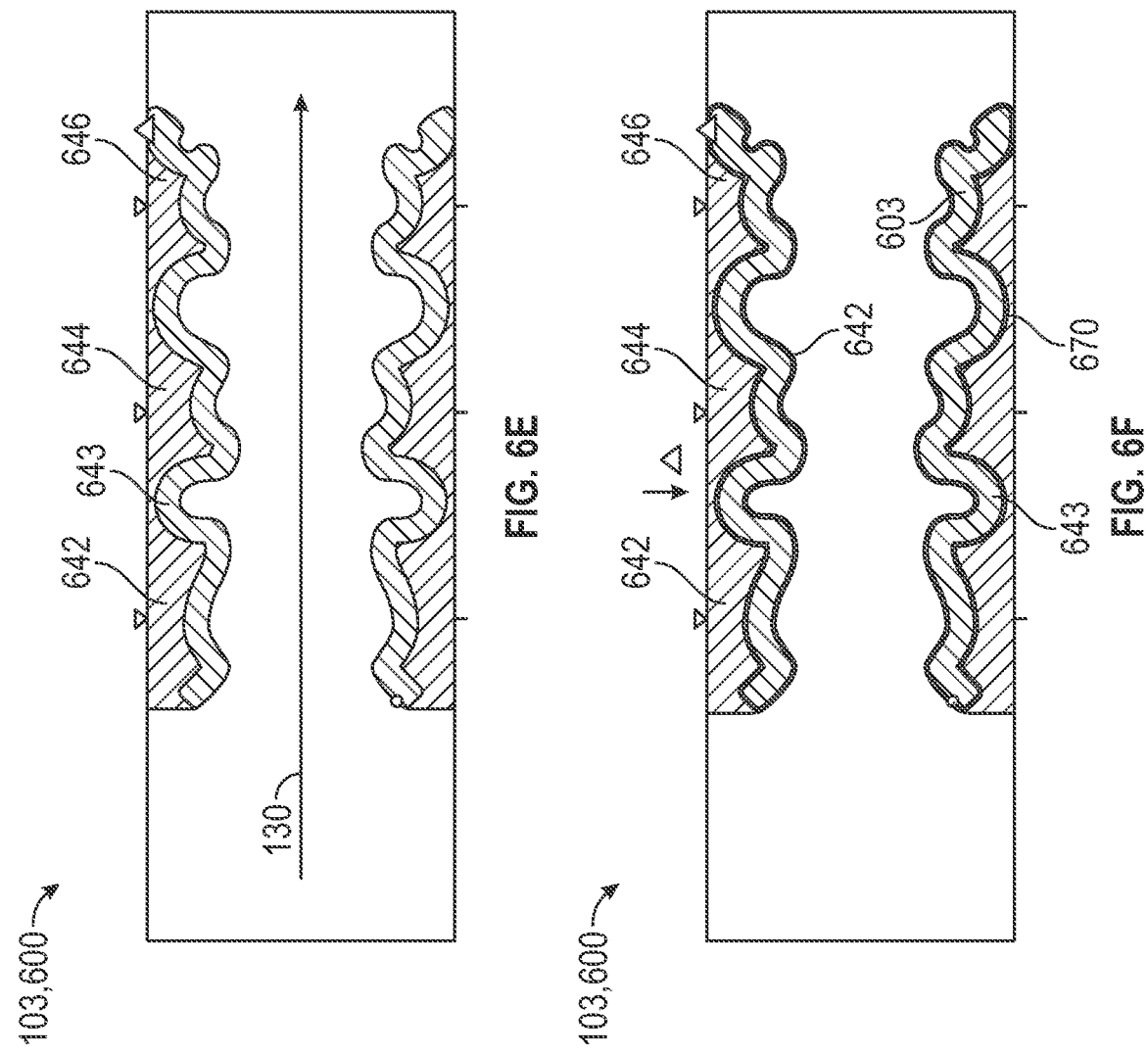

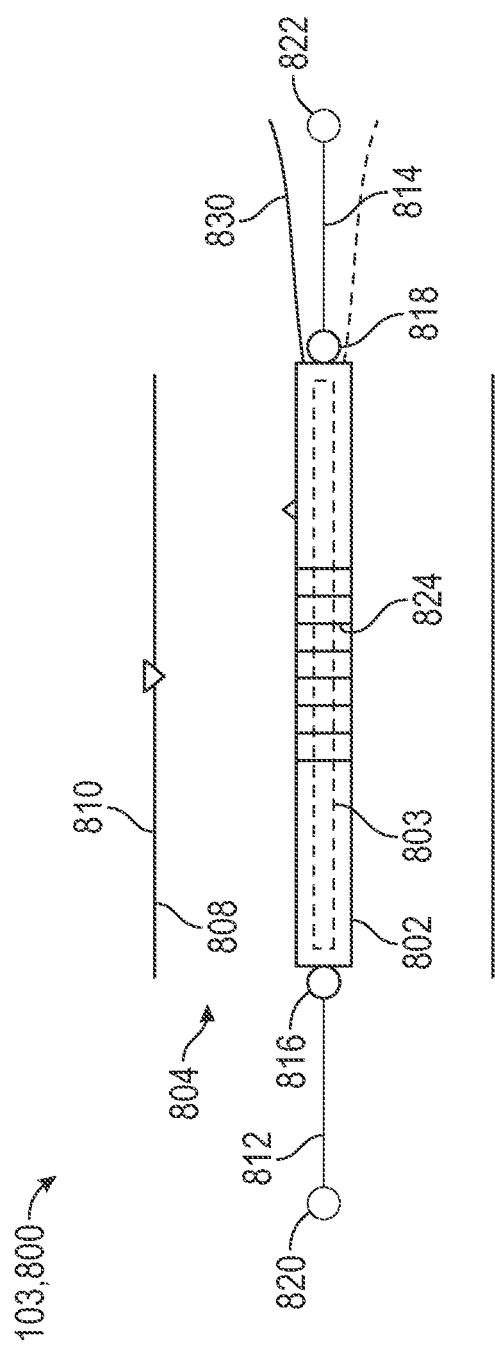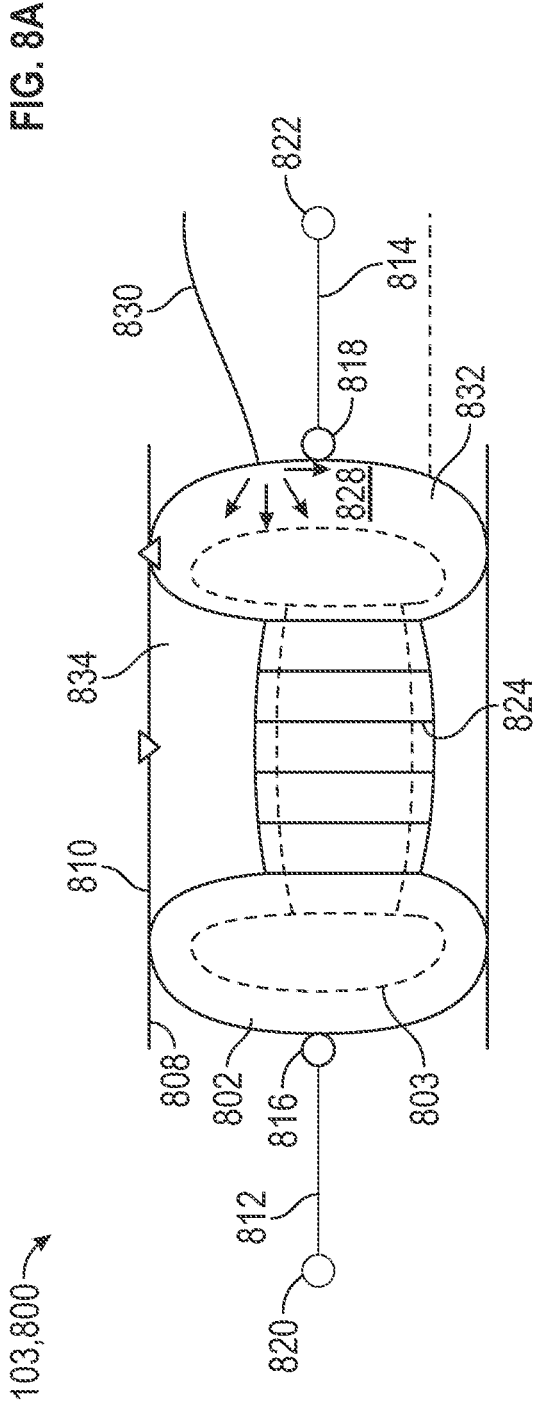

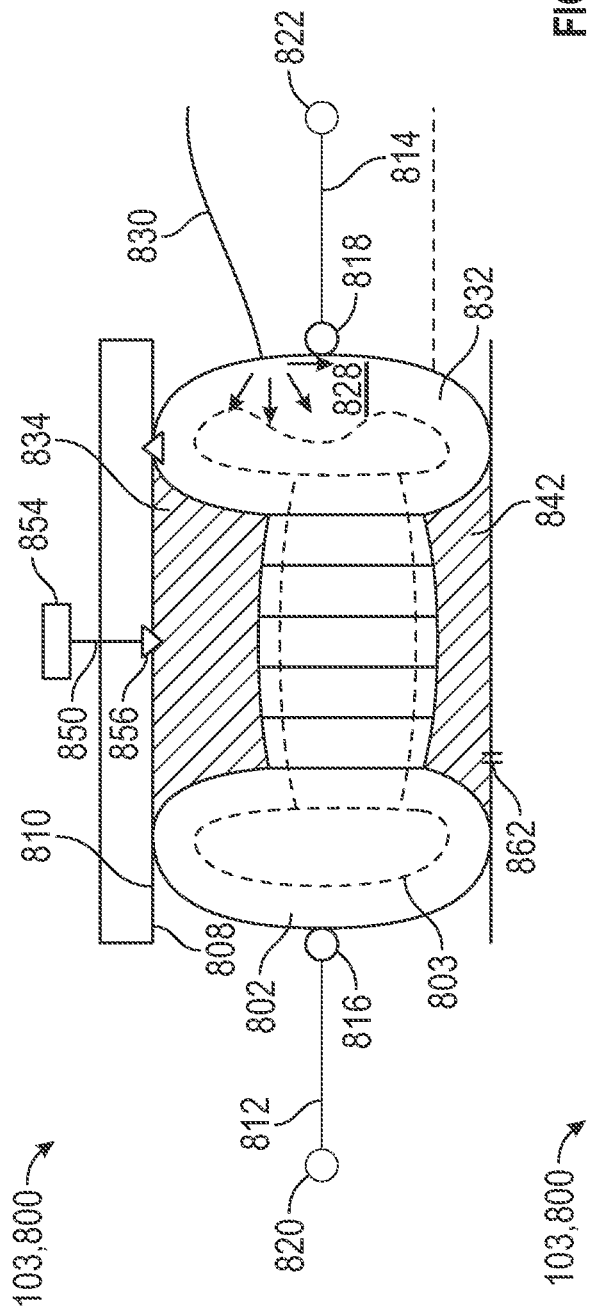
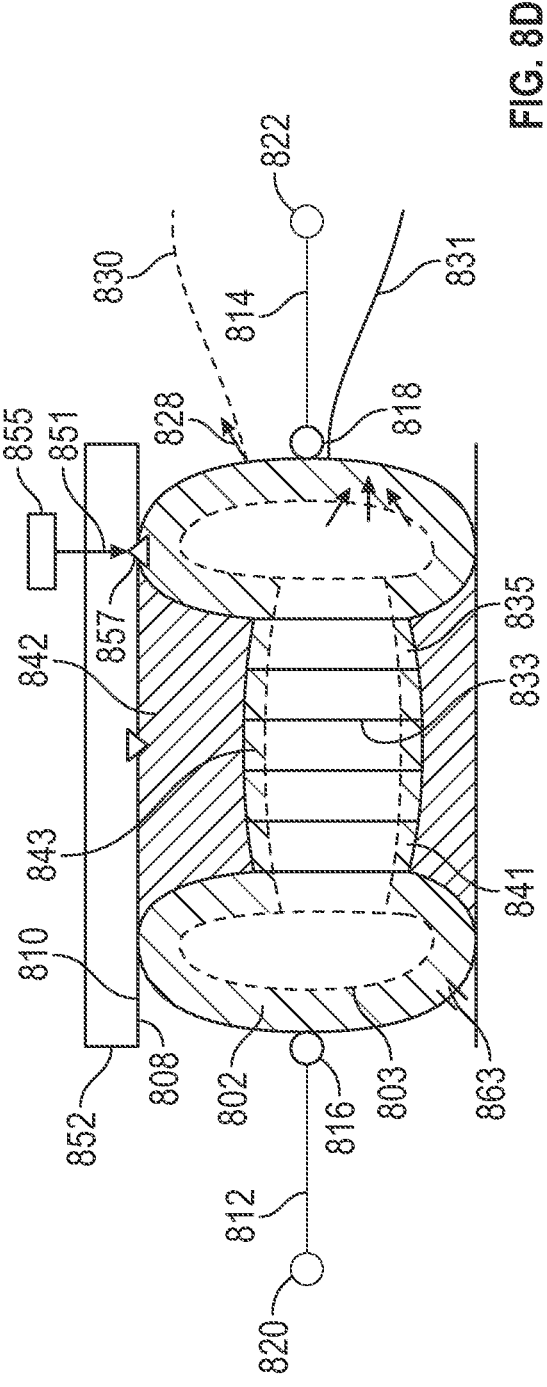
FIG. 8C
FIG. 8D

INFLATABLES-BASED PROCESS FOR CREATING MULTI-LAYER INTERNAL REINFORCEMENTS

INTRODUCTION

Structural foam is used as a lightweight solution for reinforcing and strengthening vehicle structures. In various applications, structural foam is applied internally to hollow structural members. It can be used to manage collision energy forces as well as address noise, vibration, and harshness (NVH). Further, the use of foam is helpful in reducing vehicle weight, which improves fuel efficiency.

Structural foam is foamed in place and may be formed using low-pressure injection molding. In low-pressure injection molding the foam is introduced into a hollow passage in the structural component and free rises in place. Gravity may be used to restrict rise. However, in using this method, the foam fills the entire cross-section of the hollow passage. Further, if limited sections of the structural component include the structural foam or different materials are used for structural foam at different locations, it may be necessary to form each portion, or at least portions including different materials, in individual steps. This often requires multiple forming stations and forming cycles to fill a single component.

Accordingly, while current structural foam reinforcement processes achieve their intended purpose, there is a need for a new and improved system and process for forming structural foam reinforcements.

SUMMARY

According to various aspects, the present disclosure relates to a process of forming a structural component for a vehicle. The process includes forming a first cavity in a first hollow passage between a first bladder and an interior surface of a component. In addition, the process includes forming a first structural reinforcement layer in the first cavity by filling the first cavity with a first polymer resin and foaming the first polymer resin to form a first polymer resin foam. The process further includes forming a second cavity in the first hollow passage. In addition, the process further includes forming a second structural reinforcement layer in the second cavity by filling the second cavity with a second polymer resin and foaming the second polymer resin to form a second polymer resin foam.

In aspects of the above, the first polymer resin foam and the second polymer resin foam partially fill the first hollow passage.

In any of the above aspects, the process further includes inflating the first bladder with a first fluid.

In any of the above aspects, the process further includes removing the first bladder from the first hollow passage after forming the first polymer resin foam.

In additional aspects, the process further includes inserting and inflating a second bladder into the first hollow passage after removing the first bladder from the first hollow passage, wherein the second cavity is formed between the second bladder and the first structural reinforcement layer.

In aspects of the above, the second cavity is formed between the second bladder, the first structural reinforcement layer, and the interior surface of the component.

In further aspects of the above, the process further includes removing the second bladder.

In additional aspects, a second bladder is connected to an exterior surface of the first bladder and the second cavity is present when the first bladder is inflated.

In further aspects of the above, the process further includes adhering an exterior surface of the second bladder to the first structural reinforcement layer.

In yet further aspects of the above, the process further includes removing the first bladder after filling the second cavity with the second polymer resin.

In additional aspects of the above, the process includes forming the second cavity between the first bladder and a second bladder located within the first bladder.

In further aspects of the above, the process further includes disconnecting a first supply line and a second supply line from the first bladder and the second bladder.

According to various additional aspects, the present disclosure relates to a system for forming a structural component for a vehicle. The system includes a component including a first hollow passage defined by an interior surface of the component. The system also includes a first inflatable bladder insertable into the first hollow passage of the component, wherein the first inflatable bladder and the interior surface of the component define a first cavity within the first hollow passage. The system further includes a second inflatable bladder insertable into the first hollow passage, wherein the second inflatable bladder defines a second cavity within the first hollow passage.

In aspects of the above, the system further includes a first runner system connected to the first cavity by a first port defined in the component.

In any of the above aspects, the system further includes a second runner system connected to the second cavity by a second port defined in the component.

In any of the above aspects, the second inflatable bladder is affixed to the first inflatable bladder.

In aspects of the above, the second inflatable bladder is connected to an exterior surface of the first inflatable bladder.

In further aspects of the above, the second inflatable bladder includes a bonding promoter layer.

According to various additional aspects, the present disclosure is directed to a structural component for a vehicle. The structural component includes a component having an interior surface defining a first hollow passage. The structural component also includes a first structural reinforcement contacting the interior surface of the component, the first structural reinforcement formed of a first polymer resin foam. The structural component further includes a second structural reinforcement contacting the first structural reinforcement, the second structural reinforcement formed of a second polymer resin foam. The first structural reinforcement and the second structural reinforcement form a multilayer structural reinforcement, and the component define a cross-section and the multilayer structural reinforcement partially fill the cross-section.

In aspects of the above, a bonding promoter layer positioned between the first structural reinforcement and the second structural reinforcement.

BRIEF DESCRIPTION OF THE DRAWINGS

The drawings described herein are for illustration purposes only and are not intended to limit the scope of the present disclosure in anyway.

FIG. 4A illustrates an uninflated bladder inserted into a structural component, according to an embodiment of the present disclosure.

FIG. 4B illustrates the bladder inflated within the structural component forming cavities between the bladder and structural component, according to an embodiment of the present disclosure.

FIG. 4C illustrates the introduction of a polymer resin foam in cavities formed between the structural component and inflated bladder, according to an embodiment of the present disclosure.

FIG. 4D illustrates structural reinforcements formed in the structural component and the deflated bladder, according to an embodiment of the present disclosure.

FIG. 4E illustrates the structural component including a plurality of structural reinforcements formed in the structural component after removal of the deflated bladder, according to an embodiment of the present disclosure.

FIG. 4F illustrates the insertion of a second, uninflated bladder in the structural component and the first reinforcement layer, according to an embodiment of the present disclosure.

FIG. 6A illustrates a structural component including an uninflated bladder, according to an embodiment of the present disclosure. The uninflated bladder includes a second bladder provided on the exterior of the uninflated bladder.

FIG. 6B illustrates the first bladder inflated within the structural component, according to an embodiment of the present disclosure.

FIG. 6C illustrates the introduction of a first polymer resin foam in cavities defined by the structural component and first inflated bladder, according to an embodiment of the present disclosure.

FIG. 6D illustrates the introduction of a second polymer resin foam in the second bladder, according to an embodiment of the present disclosure FIG. 6E illustrates the deflation of the first bladder, according to an embodiment of the present disclosure.

FIG. 6F illustrates a variation on the second bladder of FIGS. 6A through 6E in which the second bladder includes a bonding promoter layer, according to an embodiment of the present disclosure.

FIG. 8A illustrates the insertion a first, uninflated bladder including a second uninflated bladder into a structural component, according to an embodiment of the present disclosure.

FIG. 8B illustrates the inflation of the first, uninflated bladder including a second uninflated bladder into a structural component, according to an embodiment of the present disclosure.

FIG. 8C illustrates the introduction of a first polymer resin foam into the structural component, according to an embodiment of the present disclosure.

FIG. 8D illustrates the inflation of the second bladder within the first bladder, according to an embodiment of the present disclosure.

DETAILED DESCRIPTION

Figure 1A:
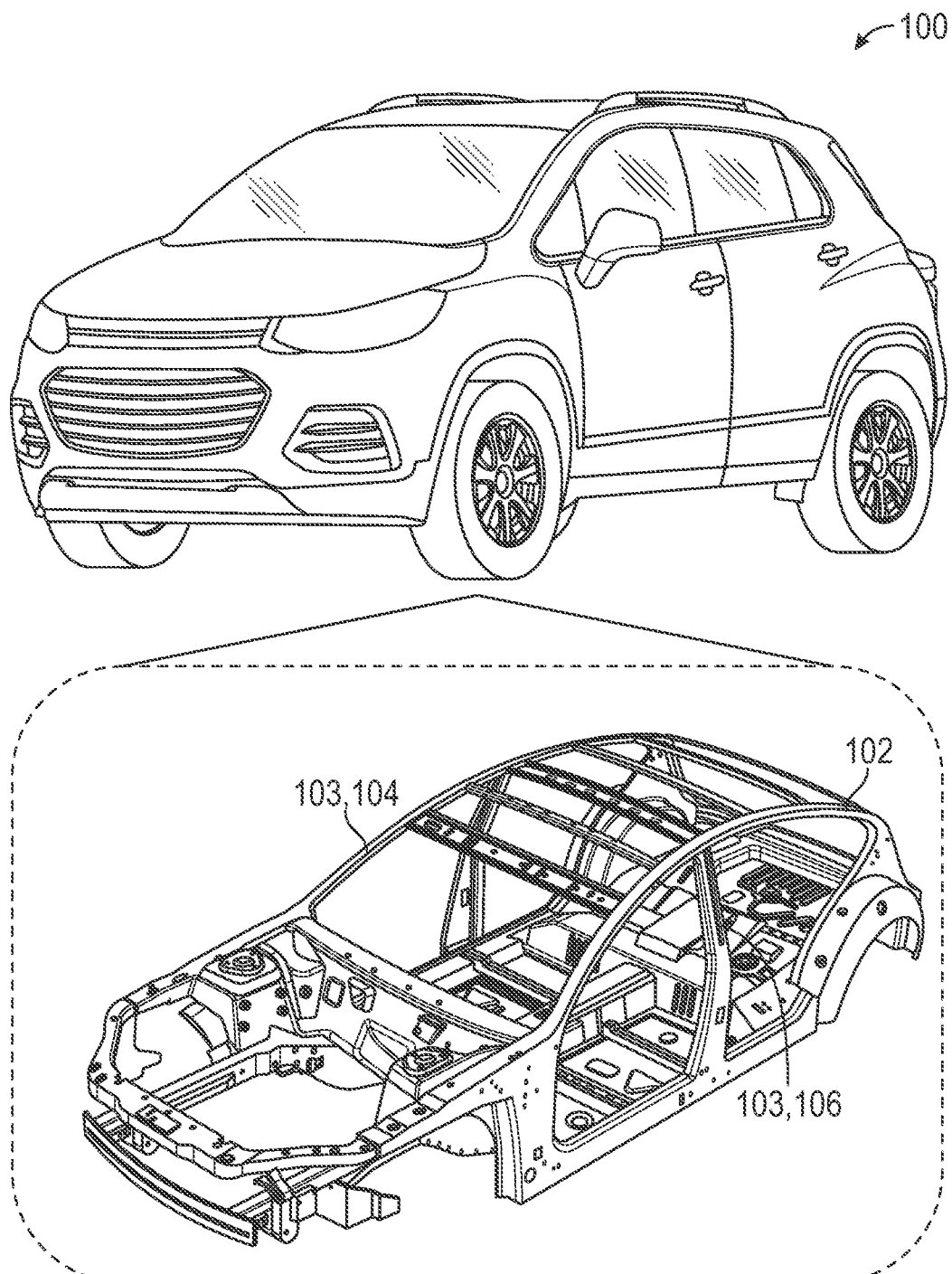
FIG. 1A illustrates a vehicle frame including several structural components in a vehicle according to aspects of the present disclosure.

The following description is merely exemplary in nature and is not intended to limit the present disclosure, application, or uses. Furthermore, there is no intention to be bound by any expressed or implied theory presented in the preceding introduction, summary, or the following detailed description. It should be understood that throughout the drawings, corresponding reference numerals indicate like or corresponding parts and features.

As used herein, the term "vehicle" is not limited to automobiles. While the present technology is described primarily herein in connection with automobiles, the technology is not limited to automobiles. The concepts can be used in a wide variety of applications, such as in connection with motorcycles, mopeds, locomotives, aircraft, marine craft, and other vehicles, or other structural or non-structural applications where it may be desirable to deposit a polymer resin in component passageways.

The present disclosure is directed to structural components including multiple layers of structural reinforcements, inflatable-based systems for forming multiple layers of structural reinforcements within structural components, and an inflatable-based process for controlling multiple layers of structural foam reinforcement molding. Structural components include components that perform at least one of the following functions: support vehicle weight, absorb road shock, and manage collision energy. A structural reinforcement is understood herein as material that improves a mechanical property of the structural component, such as a compression strength, flexural strength, tensile strength, or energy absorption capacity of the structural component.

Figure 1B:
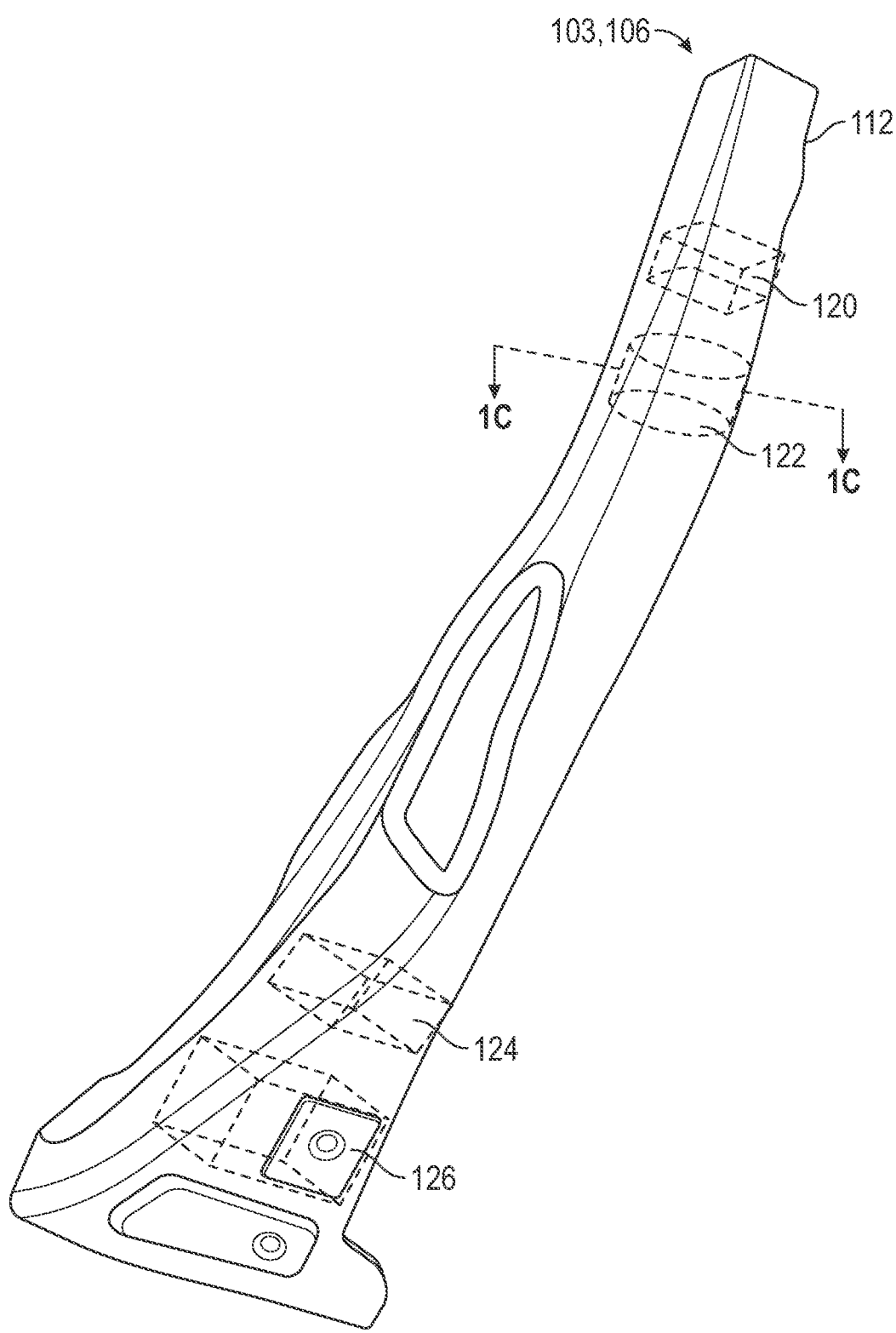
FIG. 1B illustrates a structural component including structural reinforcements formed therein, according to an embodiment of the present disclosure.
Figure 1C:
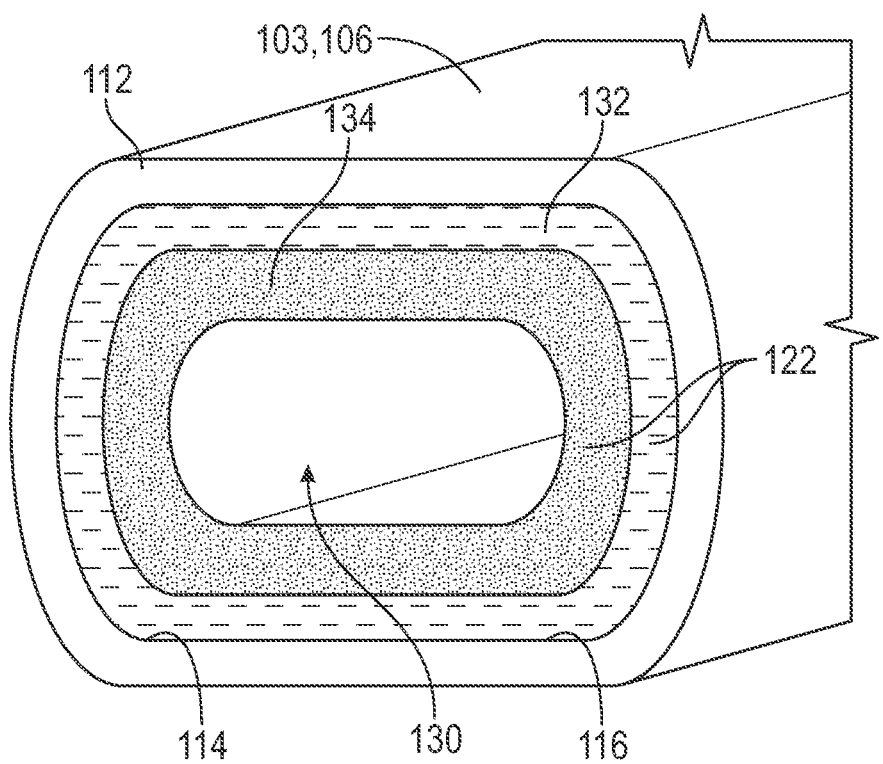
FIG. 1C illustrates a cross-section of the structural component of FIG. 1B, according to an embodiment of the present disclosure.

FIG. 1A illustrates a vehicle 100 including a body frame 102, the body frame 102 includes several structural components 103, such as the A-pillar 104 and the B-pillar 106. FIGS. 1B and 1C illustrate a B-pillar 106. The structural components 103 are formed from components 112 that include hollow passages. For example, the B-pillar 106 is formed from a component 112, which includes an interior surface 114 that defines a first hollow passage 116 within the component 112. The first hollow passage 116 is an elongate hollow passage. The structural reinforcements 120, 122, 124, 126 contact the interior surface 114 of the component 112, and are formed at different, discrete locations within the first hollow passage 116 of the component 112.

In addition, one or more of the structural reinforcements 120, 122, 124, 126 are formed of multiple layers and each of the structural reinforcements and layers are formed of a polymer resin foam, which exhibits a cellular structure. FIG. 1C illustrates a multilayer structural reinforcement 122 including a first structural reinforcement layer 132 of a first polymer resin foam including a first polymer resin and a second structural reinforcement layer 134 of a second polymer resin foam including a second polymer resin. While the structural reinforcement layers are illustrated as being concentric, it should be appreciated that other geometries may be exhibited. As illustrated, four structural reinforcements are provided; however, it should be appreciated one or more structural reinforcements may be provided for a single structural component 103, such as between one and ten structural reinforcements. In addition, where multiple structural reinforcements may be present, the structural reinforcements may be made from a variety of materials, having varying compositions, physical properties, and mechanical properties.

The multilayer structural reinforcements 120, 122, 124, 126 only partially fill a given cross-section of the first hollow passage 116 of the component 112 and do not fill the entire cross-section of the first hollow passage 116. As illustrated in FIG. 1C, the multilayer structural reinforcement 122 fills a portion of the cross-section of the first hollow passage 116 and is hollow, defining a second hollow passage 130. In other aspects, the multilayer structural reinforcement 122 fills a portion of the cross-section of the first hollow passage 116 and a second hollow passage 130 is defined by both the multilayer structural reinforcement 122 and the component 112. In aspects, the multilayer structural reinforcement 122 occludes in the range of 5 percent to 90 percent, including all values and ranges therein, of a given cross-section of the first hollow passage 116. Partial filling of the component 112 with the multi-layer structural reinforcements reduces the weight of the structural components 103 as compared to fully filling the structural component 103 with a structural reinforcement, contributing to a reduction in weight of the entire vehicle 100.

Figure 2:
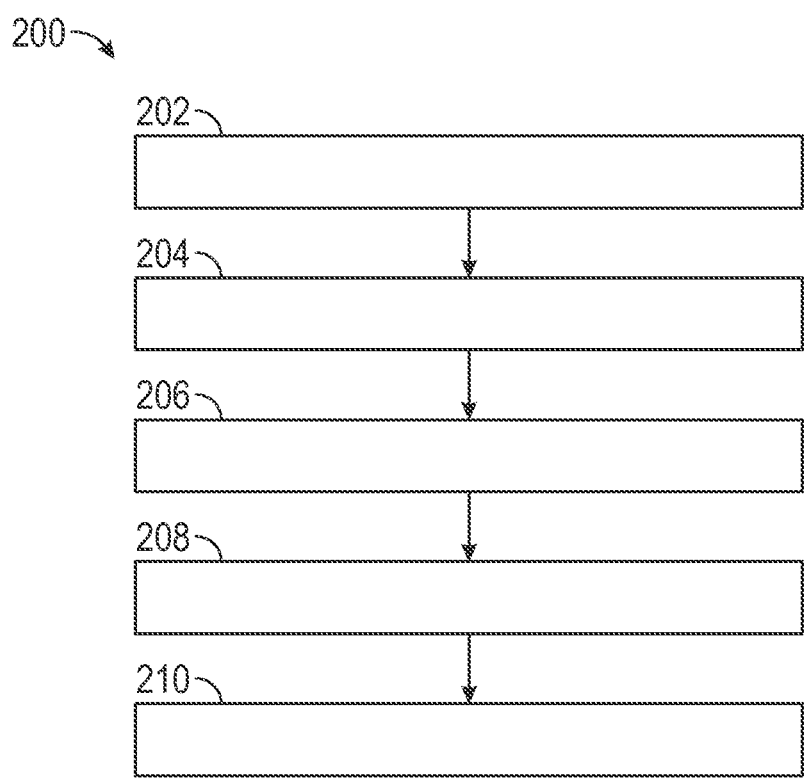
FIG. 2 illustrates a general method of forming multiple layers of structural foam reinforcements in a structural component, according to aspects of the present disclosure.
Figure 3:
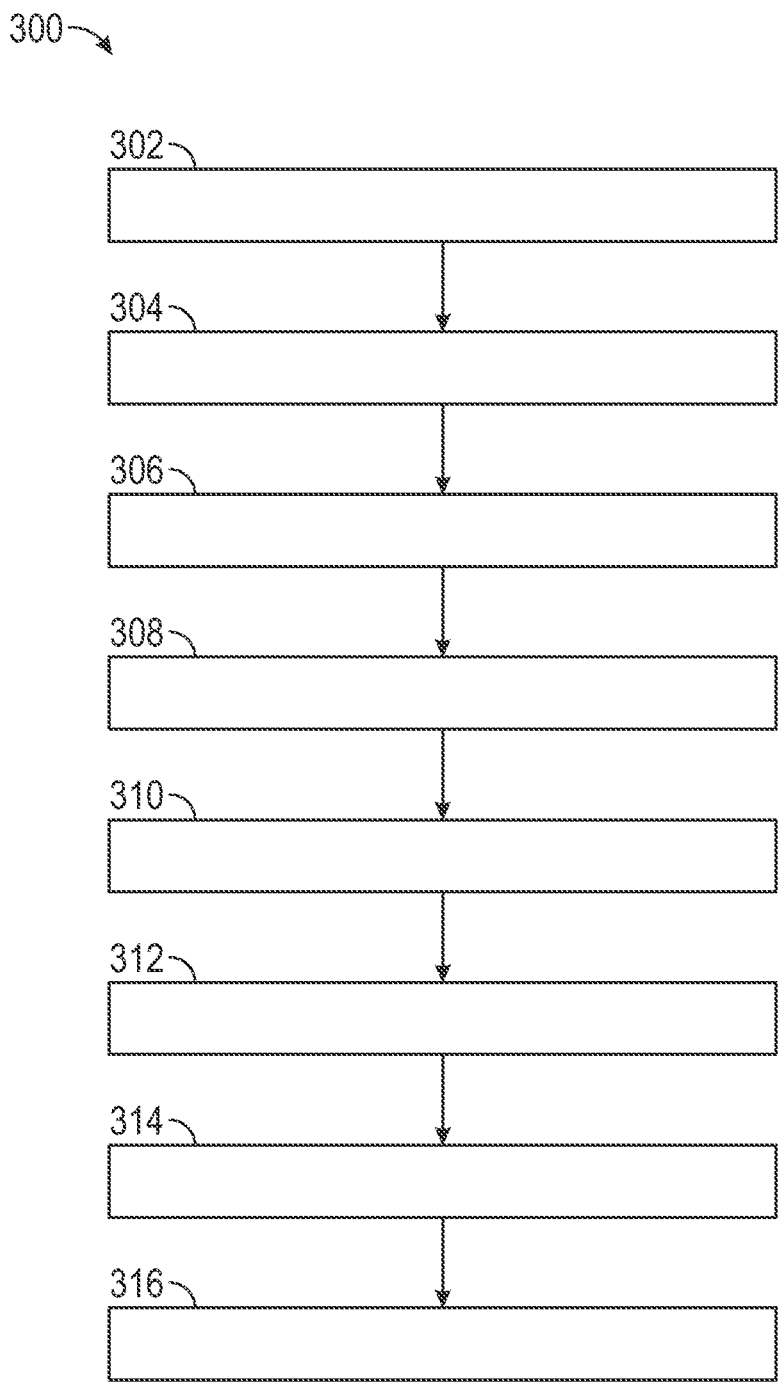
FIG. 3 illustrates a process for forming multiple layers of structural foam reinforcements in a component, according to an embodiment of the present disclosure.

A general process 200 for molding multilayer structural reinforcements 120, 122, 124, 126 within a structural component 103, such as the B-pillar 106, is illustrated in FIG. 2. At block 202 a first bladder is inserted into a structural component. In aspects, a second bladder is integrated with the first bladder, either externally around the first bladder, or internally within the first bladder. At block 204, the first layer cavities are formed by inflating the first bladder. At block 206, the first layer cavities are filled with a first polymer resin foam and the first layer of structural reinforcements are formed. If not already formed by inflating the first bladder, at block 208, the second layer cavities are formed, by inflating the second bladder. It should therefore be appreciated that block 208 is optional depending on the configuration of the first and second bladders. At block 210, the second layer cavities are filled with a polymeric rein foam and the structural reinforcements of the second layer are formed.

In aspects of the above, and with reference to FIG. 3 and FIGS. 4A through 4I, a process and system for forming a structural component 103 for a vehicle is described. The process 300 begins at block 302 by inserting an uninflated, insertable first bladder 402 into a first hollow passage 404 defined by the interior surfaces 406 of a component 408 that forms the structural component 400. The first bladder 402 includes guide wires 410, 412 connected to the first bladder 402 and extending from either side of the first bladder 402 to assist in positioning the first bladder 402 within the component 408. The guide wires 410, 412 also include attachment loops 414, 416 for locating the first bladder 402 within the component 408 and securing the first bladder 402 in place to prevent movement of the first bladder 402 in the component 408 during the molding process. The attachment loops 414, 416 may be connected to the structural component 400 or to a fixture retaining the structural component 400 in place during the molding process. In aspects, the first bladder 402 is formed from silicone, polypropylene, polyamide-reinforced polypropylene, or rubber.

The first bladder 402 further includes restricted portions 420, 422, 424, which exhibit less expansion than the remainder of the first bladder 402 when the first bladder 402 is inflated. The restricted portions 420, 422, 424 may be formed by winding thread, wire, bands, or elastic around the first bladder 402 or by forming the restricted portions 420, 422, 424 of the first bladder 402 with one or more different materials that exhibit different degrees of extensibility or deformation when a force is applied against the first bladder 402 by the fluid 428 inflating the bladder 402. By altering the number or locations of the windings or by using different materials, different geometries of the first bladder 402 and structural reinforcements 120, 122, 124, 126 may be formed. Thus, while three restricted portions are illustrated, any number of restricted portions may be provided, such as one restricted portion up to ten restricted portions. Further, it should be appreciated that while restricted portions are illustrated as extending around the entire periphery of the first bladder 402, the restriction portions may be limited to segments of the bladder periphery. In addition to restricted portions, expandable portions may also be provided that exhibit greater extensibility than the remaining portions of the bladder 402. The restricted portions 420, 422, 424 restrict the degree to which the first bladder 402 may inflate in given regions relative to the other portions of the bladder 402 and the expandable portions expand to a greater degree relative to other portions of the first bladder 402 when the bladder is inflated.

At block 304, and with reference to FIG. 4B, the first bladder 402 is inflated by filling the bladder 402 with a fluid 428, such as air, an inert gas, or a liquid, through a supply line 430 connected to the interior 432 of the first bladder 402. In the illustrated aspect, the first bladder 402 impinges on and contacts the interior surface 406 of the component 408 to define a plurality of first cavities 434, 436, 438 between the interior surface 406 of the component 408 and the first bladder 402. The shape of the inflated bladder and the inflation pressure are chosen such that the bladder forms a tight seal around the boundaries of the cavities 434, 436, 438 when it presses against the interior surface 406 of the component 408. It should be appreciated that while multiple cavities are illustrated, one cavity or two or more cavities may be defined between the interior surface 406 of the component 408 and the first bladder 402. In aspects, the temperature of the fluid 428 may be regulated, such as by circulating the fluid through a chiller or a heater, to facilitate the molding of the structural reinforcements through assisting in curing or cooling the resin later introduced into first cavities 434, 436, 438. In aspects, the first bladder 402 is coated with a mold release or is otherwise treated to prohibit adhesion of the first bladder 402 to the polymer resin foams described further herein.

After filling the first bladder 402 at block 304, at block 306 and with reference to FIG. 4C, the first cavities 434, 436, 438 are filled with a first polymer resin forming the first polymer resin foam 440, which creates the first layer of structural reinforcements 442, 444, 446. In aspects, the first polymer resin evolves gas to form a first polymer resin foam 440 through a chemical reaction. In alternative aspects, the first polymer resin foam 440 includes blowing agents or expandable particles, which are expanded to form a foam. In aspects, foaming may be triggered upon heating the polymer resin either before or after the resin enters the cavity. Examples of first polymer resin foams 440 include, for example, one part or two-part foams, thermoplastic materials that include expandable particles or blowing agents, or thermoplastic materials that are mixed with a gas after melting and prior to molding. First polymer resins used to form first polymer resin foams 440 include, e.g., one or more of: polyurethane, epoxy, polyisocyanurate, ethylene vinyl acetate, polyolefin, polyolefin-ethylene vinyl acetate blends, polybutylene terephthalate, polycarbonate, polyphenylene oxide, polyethylene terephthalate, and acrylonitrile butadiene styrene. As noted above, more than one first polymer resin foam 440 may be used when a given structural component 400 includes multiple structural reinforcements 442, 444, 446. Different first polymer resins, or different amounts of polymer resin, may be used to form the first polymer resin foam 440 for each structural reinforcement or the same first polymer resin with different amounts of foaming agent may be used. The different first polymer resin foams 440 may exhibit different densities or different mechanical properties including compression strength and tensile strength. In additional or alternative aspects, different amounts of polymer resin may be injected into a given cavity to provide polymer resin foams of different densities.

The first polymer resin forming the first polymer resin foam 440 is introduced by a runner system 450. In aspects, the runner system 450 is formed in one or more fixtures 452 the component 408 is retained against. In other aspects, the runner system 450 is formed from tubing that is connectable to the component 408. The component 408 defines a plurality of ports 456, 458, 460 which connect the first cavities 434, 436, 438 to the runner system 450 for introducing the first polymer resin of the first polymer resin foam 440 into first cavities 434, 436, 438, before or after foaming the first polymer resin. Further, the runner system 450 is connected to a first polymer resin supply 454. In aspects, the first polymer resin supply 454 includes one or more of the following: supply drums, accumulators, metering pumps, feeders, extruders, and mixers. In aspects, each port 456, 458, 460 is connected to an independent runner system 450, which in turn is connected to its own polymer resin supply 464. Each polymer resin supply 454 is individually metered to allow a precise amount of polymer resin to be supplied to each cavity 434, 436, 438. Further, vents 462, 464, 466 are defined in component 408 and connected to the first cavities 434, 436, 438 to vent air out of the first cavities 434, 436, 438 as the first polymer resin of the first polymer resin foam 440 is being injected into the first cavities 434, 436, 438.

In optional aspects, prior to filling the first cavities 434, 436, 438, the first polymer resin is melted, multiple feedstock components of the first polymer resin are mixed, or the first polymer resin is melted and combined with a gas. For example, when a thermoplastic resin is used, the first polymer resin is melted through the application of heat and, in some aspects, combined with gas. In another example, when a two-component polyurethane or epoxy is used, the resin components are mixed. Or, in alternative aspects, the first polymer resin is introduced without pre-treatment such as melting, mixing, or combining with a gas, such as in the case of a one-part polyurethane.

After filling the first cavities 434, 436, 438 with the first polymer resin of the first polymer resin foam 440, the first polymer resin is crosslinked or solidified in the first cavities 434, 436, 438. For example, where the first polymer resin is a two-component mixture, the first polymer resin may form cross-links and solidify into the first polymer resin foam 440. In other examples, the first polymer resin is heated to initiate cross-linking, or kick-off a blowing agent in a first polymer resin in a melt state or expand expandable particles in the first polymer resin in a melt state, to cause the evolution or expansion of gasses, forming the first polymer resin foam 440. When the first polymer resin of the first polymer resin foam 440 is provided as a melt, the foamed first polymer resin may cool and solidify. It should be appreciated that the first polymer resin does not need to be completely crosslinked or completely cooled to ambient temperature but crosslinked sufficiently or cooled sufficiently so that the first layer of structural reinforcements 442, 444, 446 resist deformation upon removal of the first bladder 402.

With reference to FIGS. 4D and 4E, once the first polymer resin foam 440 is sufficiently solidified, at block 308 the first bladder 402 is deflated and removed from the structural component 400 and the first layer of structural reinforcements 442, 444, 446 contacting the interior surface 406 of the component 408. In aspects, the first bladder 402 may be deflated by pumping the liquid out of the first bladder 402 or by simply reducing the pressure applied to the fluid 428 in the first bladder 402 by the elastic recovery of the first bladder 402 or an external source. As illustrated, the structural reinforcements 120, 122, 124, 126, 442, 444, 446 assume a variety of shapes depending on the shape of the component 112, 408 and the bladder 402.

At block 310, and with reference to FIG. 4F, the process of forming another, second layer of structural reinforcements begins by inserting an uninflated, insertable second bladder 403 into the first hollow passage 404 defined by the interior surfaces 406 of the component 408 and one or more second hollow passages 405 defined by the first layer of structural reinforcements 442, 444, 446. The second bladder 403 includes guide wires 411, 413 connected to the second bladder 403 and extending from either side of the second bladder 403 to assist in positioning the second bladder 403 within the component 408. The guide wires 411, 413 also include attachment loops 415, 417 for securing the second bladder 403 in place to prevent movement of the second bladder 403 in the component 408 during the molding process. The attachment loops 415, 417 may be connected to the structural component 400 or to a fixture retaining the structural component 400 in place during the molding process. In aspects, the second bladder 403 is formed from silicone, polypropylene, polyamide-reinforced polypropylene, or rubber. In aspects, the second bladder 403 is coated with a mold release or is otherwise treated to prohibit adhesion of the second bladder 403 to the polymer resin foams described further herein.

Like the first bladder 402, the second bladder 403 further includes one or more restricted portions 421, which exhibit less expansion than the remainder of the second bladder 403 when the second bladder 403 is inflated. The restricted portions 421 may be formed by winding thread, wire, bands, or elastic around the second bladder 403 or by forming the restricted portions 421 of the second bladder 403 with one or more different materials that exhibit different degrees of extensibility or deformation when a force is applied against the second bladder 403 by the fluid 429 inflating the second bladder 403. By altering the number or locations of the windings or by using different materials, different geometries of the second bladder 403 and second layer of structural reinforcements 120, 443 may be formed. Thus, while one restricted portion of the second bladder 403 is illustrated, any number of restricted portions may be provided, such as one restricted portion up to ten restricted portions. Further, it should be appreciated that while restricted portions are illustrated as extending around the entire periphery of the second bladder 403, the restriction portions may be limited to segments of the bladder periphery. In addition to restricted portions, expendable portions may also be provided. The restricted portions 421 restrict the degree to which the second bladder 403 may inflate in given regions relative to the other portions of the second bladder 403 and the expandable portions expand to a greater degree relative to other portions of the second bladder 403 when the bladder is inflated.

Figure 4G:
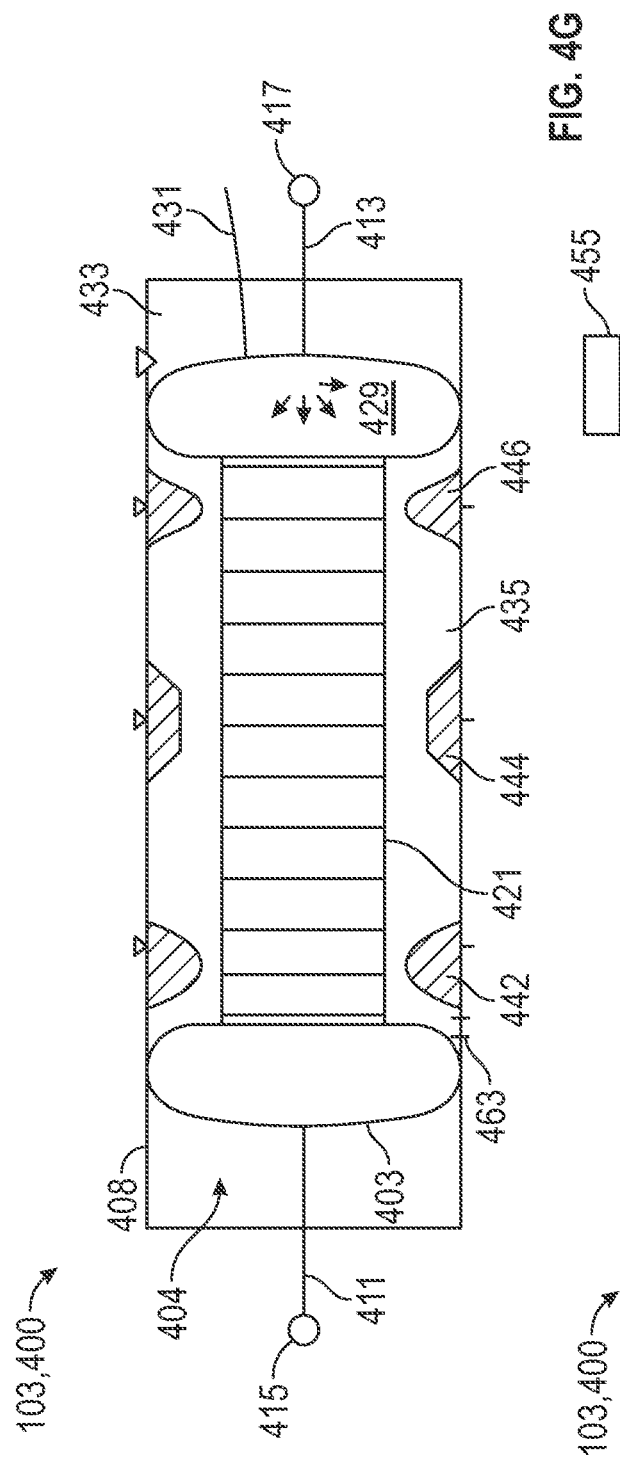
FIG. 4G illustrates the second bladder after inflation, according to an embodiment of the present disclosure.

At block 312, and with reference to FIG. 4G, the second bladder 403 is inflated by filling the second bladder 403 with a fluid 429, such as air, an inert gas, or a liquid, through a second supply line 431 connected to the interior 433 of the second bladder 403. In the illustrated aspect, the second bladder 403 impinges on and contacts the interior surface 406 of the component 408 to define a second cavity 435 between the interior surface 406 of the component 408, the first layer of structural reinforcements 442, 444, 446 and the second bladder 403. It should be appreciated that while a single second cavity 435 is illustrated, multiple cavities may be defined. In aspects, the temperature of the fluid 429 may be regulated, such as by circulating the fluid 429 through a chiller or a heater, to facilitate the molding of the structural reinforcements through assisting in curing or cooling the resin later introduced into second cavity 435.

Figure 4H:
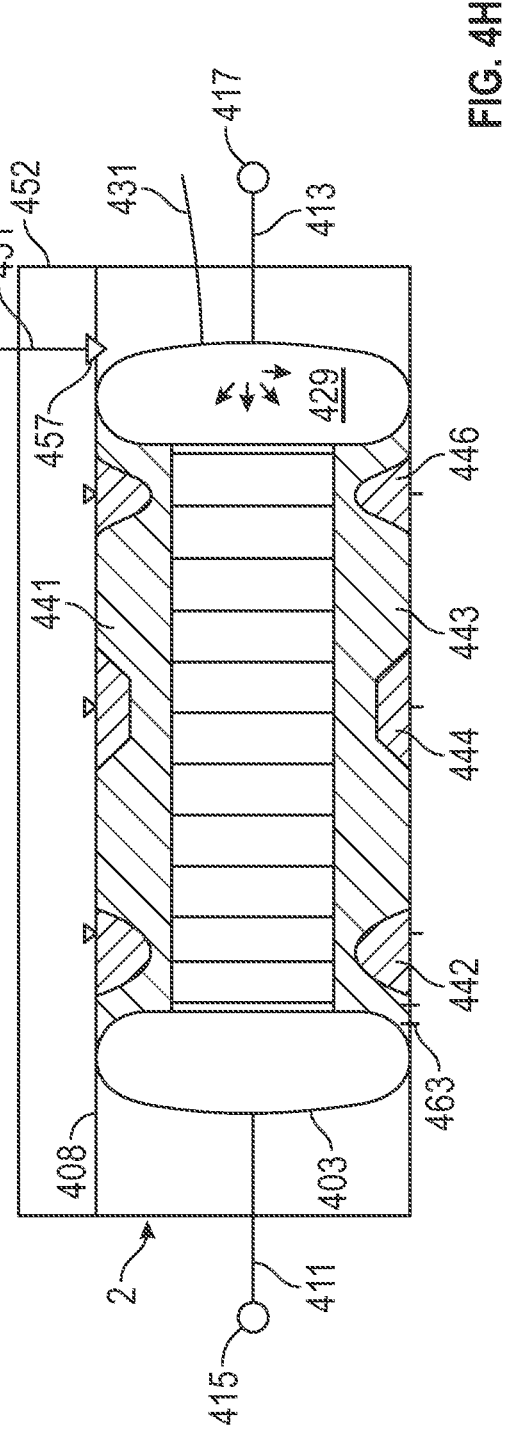
FIG. 4H illustrates the formation of a second layer of structural reinforcements formed in the structural component, according to an embodiment of the present disclosure.

After filling the second bladder 403 at block 312, at block 314, and with reference to FIG. 4H, the second cavity 435 is filled with a second polymer resin forming the second polymer resin foam 441, which creates the second layer of structural reinforcements 443. As with the first layer of structural reinforcements 442, 444, 446, in aspects, the second polymer resin evolves gas to form a second polymer resin foam 441 through a chemical reaction. In alternative aspects, the second polymer resin foam 441 includes blowing agents or expandable particles, which are expanded to form the foam. In aspects, foaming may be triggered upon heating the second polymer resin. Examples of second polymer resin foams 441 include, for example, one part or two-part foams, thermoplastic materials that include expandable particles or blowing agents, or thermoplastic materials that are mixed with a gas after melting and prior to molding. Second polymer resins used to form second polymer resin foams 441 include, e.g., one or more of: polyurethane, epoxy, polyisocyanurate, ethylene vinyl acetate, polyolefin, polyolefin-ethylene vinyl acetate blends, polybutylene terephthalate, polycarbonate, polyphenylene oxide, polyethylene terephthalate, and acrylonitrile butadiene styrene. As noted above, more than one second polymer resin foam 441 may be used when a given structural component 400 includes multiple structural reinforcements. Different second polymer resins may be used to form the second polymer resin foam 441 of each structural reinforcement or the same second polymer resin with different amounts of foaming agent may be used. The different second polymer resin foams 441 may exhibit different densities or different mechanical properties including compression strength and tensile strength. In additional or alternative aspects, different amounts of polymer resin may be injected into a given cavity to provide polymer resin foams of different densities.

The second polymer resin forming the second polymer resin foam 441 is introduced by a second runner system 451. In aspects, the second runner system 451 is formed in the one or more fixtures 452 the component 408 is retained against. In additional or alternative aspects, the second runner system 451 is formed from tubing that is connectable to the component 408. The component 408 defines a port 457, as illustrated, or a plurality of ports, connected to the second cavity 435 and connectable to the runner system 451 for introducing the second polymer resin of the second polymer resin foam 441 into the second cavity 435, before or after foaming the second polymer resin. Further, the runner system 451 is connected to a second polymer resin supply 455. In aspects, the second polymer resin supply 455 includes one or more of the following: supply drums, accumulators, metering pumps, feeders, extruders, and mixers. As noted above, if more than one second cavity 435 and more than one port 457 is provided, then each port may be coupled to a dedicated polymer resin supply 455 using a dedicated runner system 451. Further, a vent 463 is defined in component 408 and connected to the second cavity 435 to vent air out of the second cavity 435 as the second polymer resin of the second polymer resin foam 441 is being injected into the second cavity 435. It should be appreciated that in forming the first layer of structural reinforcements 442, 444, 446, the first bladder 402 blocks the port 457 and vent 463 used in forming the second layer of structural reinforcements 443. In addition, in forming the second layer of structural reinforcements 443, the second bladder 403 blocks the ports 456, 458, 460 and vents 462, 464, 466 used in forming the first layer of structural reinforcements 442, 444, 446.

In optional aspects, prior to filling the second cavity 435, the second polymer resin is melted, multiple feedstock components of the second polymer resin are mixed, or the second polymer resin is melted and combined with a gas. For example, when a thermoplastic resin is used, the second polymer resin is melted through the application of heat and, in some aspects, combined with gas. In another example, when a two-component polymer resin, such as polyurethane or epoxy, is used, the resin components are mixed. Or, in alternative aspects, the second polymer resin is introduced without pre-treatment such as melting, mixing, or combining with a gas, such as in the case of a one-part polyurethane.

After filling the second cavity 435 with the second polymer resin of the second polymer resin foam 441, the second polymer resin is crosslinked or solidified in the second cavity 435. For example, where the second polymer resin is a two-component mixture, the second polymer resin may form cross-links and solidify into the second polymer resin foam 441. In other examples, the second polymer resin is heated to initiate cross-linking, or kick-off a blowing agent when a second polymer resin in a melt state or expand expandable particles when the second polymer resin in a melt state, to cause the evolution or expansion of gasses, forming the second polymer resin foam 441. When the second polymer resin of the second polymer resin foam 441 is provided as a melt, the foamed second polymer resin may cool and solidify. It should be appreciated that the second polymer resin does not need to be completely crosslinked or completely cooled to ambient temperature but crosslinked sufficiently or cooled sufficiently so that the second layer of structural reinforcement 443 resists deformation upon removal of the second bladder 403.

Figure 4I:
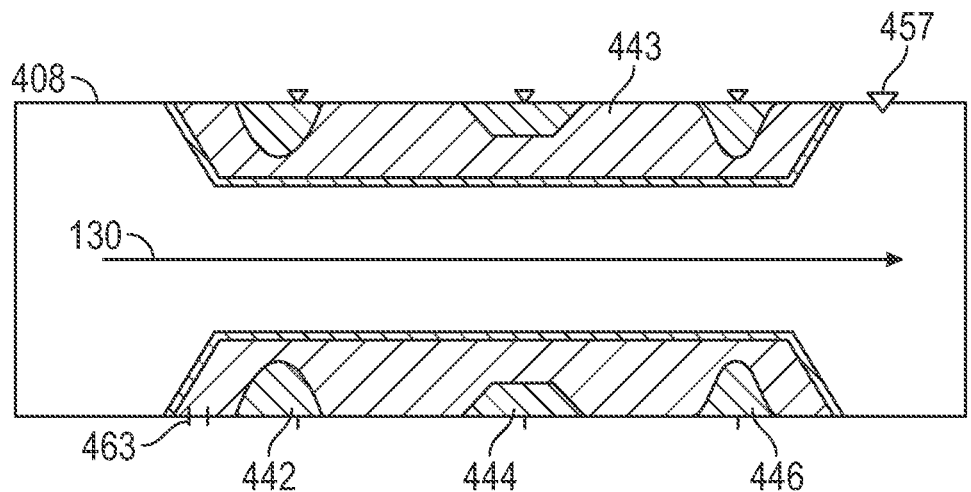
FIG. 4I illustrates the multilayer structural component after removal of the second bladder, according to an aspect of the present disclosure.
Figure 5:
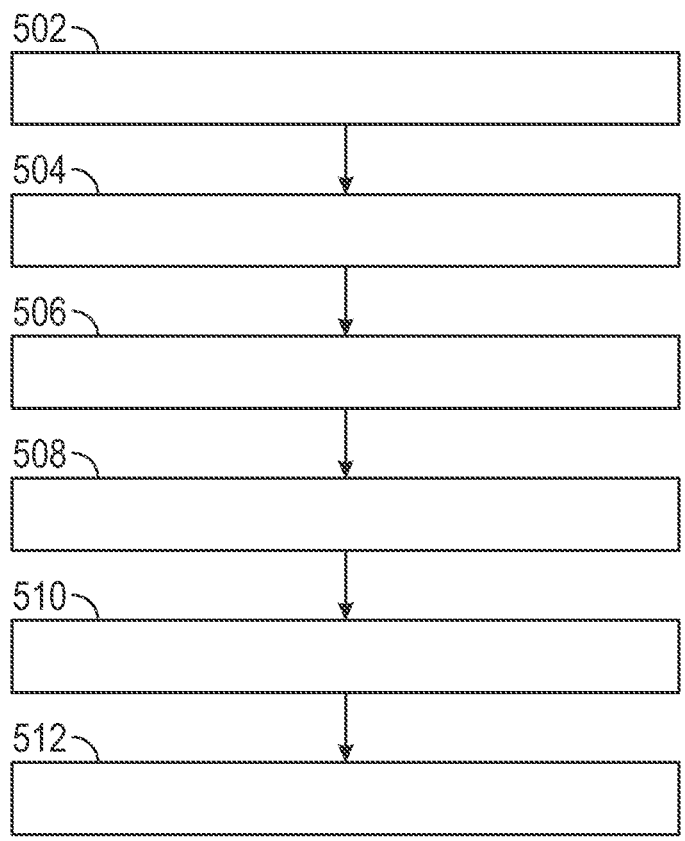
FIG. 5 illustrates a process for forming a multiple layers of structural foam reinforcements in a component, according to an embodiment of the present disclosure.
Figure 7:
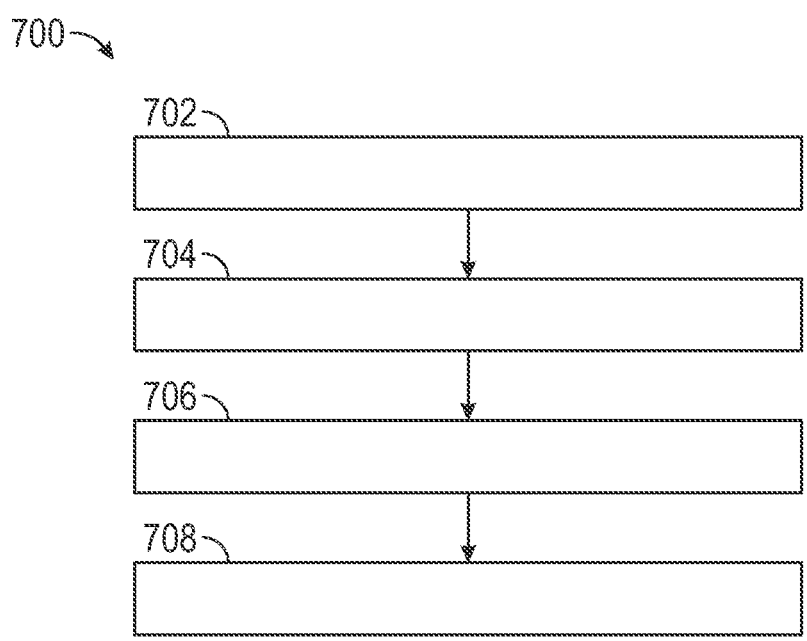
FIG. 7 illustrates a process for forming multiple layers of structural foam reinforcements in a component, according to an embodiment of the present disclosure.

With reference to FIG. 4I, once the second polymer resin foam 441 is sufficiently solidified, at block 316 the second bladder 403 is deflated and removed from the structural component 400 which now includes the first layer of structural reinforcements 442, 444, 446 contacting the interior surface 406 of the component 408 and the second layer of the structural reinforcement 443 contacting both the inner surface of the component 408 and the first layer of structural reinforcements 442, 444, 446. In aspects, the second bladder 403 may be deflated by pumping the liquid out of the second bladder 403 or by simply reducing the pressure applied to the fluid 429 in the second bladder 403 by the elastic recovery of the second bladder 403 or an external source. As illustrated, the second layer of structural reinforcements 120, 122, 124, 126, 443 assume a variety of shapes depending on the shape of the component 112, 408, the first layer of structural reinforcements 442, 444, 446 and the second bladder 403. As noted above, the first and second layer of structural reinforcements 442, 443, 444, 446 define a second hollow passage 130 after removal of the second bladder 403. It should further be appreciated that additional bladders may be provided, and the process described above repeated to provide additional structural reinforcement layers.

Further aspects of the process and system for forming a structural component 103 for a vehicle as set forth in FIG. 2 are described herein with reference to FIG. 5 and FIGS. 6A through 6F. The process 500 begins at block 502 by inserting an uninflated, insertable first bladder 602 and a second bladder 603 connected to an exterior surface 604 of the first bladder 602 into a first hollow passage 606 defined by the interior surfaces 608 of a component 610 forming the structural component 600. The first bladder 602 includes guide wires 612, 614 connected to the first bladder 602 and extending from either side of the first bladder 602 to assist in positioning the first bladder 602 within the component 610. The guide wires 612, 614 also include attachment loops 616, 618 for securing the first bladder 602 in place to prevent movement of the first bladder 602 in the component 610 during the molding process. The attachment loops 616, 618 may be connected to the structural component 600 or to a fixture retaining the structural component 600 in place during the molding process. In aspects, the first bladder 602 is formed from silicone, polypropylene, polyamide-reinforced polypropylene, or rubber.

As with the first bladder 402 of the aspects described with reference to FIGS. 4A through 4I above, the first bladder 602 further includes restricted portions, 620, 622, 624, which exhibit less expansion than the remainder of the first bladder 602 when the first bladder 602 is inflated. The restricted portions 620, 622, 624 are formed in a manner similar and of similar materials to the first bladder 402 described above. Again, while three restricted portions are illustrated, any number of restricted portions may be provided, such as one restricted portion up to ten restricted portions. Further, it should be appreciated that while restricted portions are illustrated as extending around the entire periphery of the first bladder 602, the restriction portions may be limited to segments of the bladder periphery. In addition to restricted portions, expendable portions may also be provided as described above, which exhibit a greater extensibility than the remainder of the bladder 602.

At block 504, and with reference to FIG. 6B, the first bladder 602 is inflated by filling the bladder 602 with a fluid 628, such as air, an inert gas, or a liquid, through a supply line 630 connected to the interior 632 of the first bladder 602. This in turn expands the second bladder 603 connected to the exterior surface 604 of the first bladder 602. The second bladder 603, as illustrated, remains unfilled and assumes the shape defined by the first bladder 602 when the first bladder 602 is inflated. In the illustrated aspect, parts of the first bladder 602 and second bladder 603 impinge on and contact the interior surface 608 of the component 610 to define a plurality of first cavities 634, 636, 638 between the interior surface 608 of the component 610 and the two bladders 602, 603. It should be appreciated that while multiple cavities are illustrated, one cavity or two or more cavities may be defined. In aspects, the temperature of the fluid 628 may be regulated, such as by circulating the fluid 628 through a chiller or a heater, to facilitate the molding of the structural reinforcements through assisting in curing or cooling the resin later introduced into first cavities 634, 636, 638.

After filling the bladder 602 at block 504, at block 506 and with reference to FIG. 6C the first cavities 634, 636, 638, are filled with a first polymer resin forming the first polymer resin foam 640, which creates the first layer of structural reinforcements 642, 644, 646. As in the aspects described above with reference to FIGS. 4A through 4I, the first polymer resin evolves gas to form a first polymer resin foam 640 through a chemical reaction. In alternative aspects, the first polymer resin foam 640 includes blowing agents or expandable particles, which are expanded to form a foam. In aspects, foaming may be triggered upon heating the first polymer resin. Examples of first polymer resin foams 640 include, for example, one part or two-part foams, thermoplastic materials that include expandable particles or blowing agents, or thermoplastic materials that are mixed with a gas after melting and prior to molding. First polymer resins used to form first polymer resin foams 640 include, e.g., one or more of: polyurethane, epoxy, polyisocyanurate, ethylene vinyl acetate, polyolefin, polyolefin-ethylene vinyl acetate blends, polybutylene terephthalate, polycarbonate, polyphenylene oxide, polyethylene terephthalate, and acrylonitrile butadiene styrene. As noted above, more than one first polymer resin foam 640 may be used when a given structural component 600 includes multiple structural reinforcements 642, 644, 646. Different first polymer resins may be used to form the first polymer resin foam 640 of each structural reinforcement or the same first polymer resin with different amounts of foaming agent may be used. The different first polymer resin foams 640 may exhibit different densities or different mechanical properties including compression strength and tensile strength. In additional or alternative aspects, different amounts of polymer resin may be injected into a given cavity to provide polymer resin foams of different densities.

The first polymer resin forming the first polymer resin foam 640 is introduced by a runner system 650. In aspects, the runner system 650 is formed in one or more fixtures 652 the component 610 may be retained by during the molding process. In other aspects, the runner system 650 is formed from tubing that is connectable to the component 610. The component 610 defines a plurality of ports 656, 658, 660 connected to the first cavities 634, 636, 638 and connectable to the runner system 650 for introducing the first polymer resin of the first polymer resin foam 640 into first cavities 634, 636, 638, before or after foaming the first polymer resin. Further, the runner system 650 is connected to a first polymer resin supply 654. In aspects, the first polymer resin supply 654 includes one or more of the following: supply drums, accumulators, metering pumps, feeders, extruders, and mixers. Again, as noted above, each cavity 634, 636, 638 may be connected to its own runner system 650 and polymer resin supply 654 to allow for different polymer resins to be introduced into each cavity as well as to allow adjustment of the rate the polymer resin is metered into each cavity. Further, vents 662, 664, 666 are defined in component 610 and connected to the first cavities 634, 636, 638 to vent air out of the first cavities 634, 636, 638 as the first polymer resin is being injected into the first cavities 634, 636, 638.

In optional aspects, prior to filling the first cavities 634, 636, 638, the first polymer resin is melted, multiple feedstock components of the first polymer resin are mixed, or the first polymer resin is melted and combined with a gas. For example, when a thermoplastic resin is used, the first polymer resin is melted through the application of heat and, in some aspects, combined with gas. In another example, when a two-component polymer resin, such as polyurethane or epoxy, is used, the resin components are mixed. Or, in alternative aspects, the first polymer resin is introduced without pre-treatment such as melting, mixing, or combining with a gas, such as in the case of a one-part polyurethane.

After filling the first cavities 634, 636, 638 with the first polymer resin, the first polymer resin is crosslinked or solidified in the first cavities 634, 636, 638 to form the first polymer resin foam 640. For example, where the first polymer resin is a two-component mixture, the polymer resin may form cross-links and solidify into the polymer resin foam 640. In other examples, the first polymer resin is heated to initiate cross-linking, or kick-off a blowing agent in a first polymer resin in a melt state or expand expandable particles in the first polymer resin in a melt state, to cause the evolution or expansion of gasses, forming the first polymer resin foam 640. When the first polymer resin of the first polymer resin foam 640 is provided as a melt, the foamed first polymer resin may cool and solidify. It should be appreciated that the first polymer resin does not need to be completely crosslinked or completely cooled to ambient temperature but crosslinked sufficiently or cooled sufficiently so that the structural reinforcements 642, 644, 646 resist deformation upon removal of the first bladder 602.

With reference to FIGS. 6D, once the first polymer resin foam 640 is sufficiently solidified, at block 508 the process of forming another, second layer of structural reinforcements begins by reducing the pressure of the fluid 628 used to inflate the first bladder 602 and filling the second bladder 603 connected to the first bladder 602 with a second polymer resin foam 641. Reducing the pressure of the fluid 628 in the first bladder 602 provides space for the second bladder 603 to expand. As noted above, the second bladder 603 defines a second cavity 635 enclosed by its walls that has been unfilled until now. The second cavity 635 is filled with polymer resin for forming the second polymer resin foam 641, which forms the second layer of structural reinforcement 643. In aspects, the second bladder 603 is formed from silicone, polypropylene, polyamide-reinforced polypropylene, or rubber. The shape of the second bladder 603 may be manipulated upon filling the first bladder 602. It should be appreciated that while a single second cavity 635 is illustrated, multiple cavities may be defined.

As with the first layer of structural reinforcements 642, 644, 646, in aspects, the second polymer resin evolves gas to form a second polymer resin foam 641 through a chemical reaction. In alternative aspects, the second polymer resin foam 641 includes blowing agents or expandable particles, which are expanded to form a foam. In aspects, foaming may be triggered upon heating the second polymer resin. Examples of second polymer resin foams 641 include, for example, one part or two-part foams, thermoplastic materials that include expandable particles or blowing agents, or thermoplastic materials that are mixed with a gas after melting and prior to molding. Second polymer resins used to form second polymer resin foams 641 include, e.g., one or more of: polyurethane, epoxy, polyisocyanurate, ethylene vinyl acetate, polyolefin, polyolefin-ethylene vinyl acetate blends, polybutylene terephthalate, polycarbonate, polyphenylene oxide, polyethylene terephthalate, and acrylonitrile butadiene styrene. As noted above, more than one second polymer resin foam 641 may be used when a given structural component 600 includes multiple structural reinforcements. Different second polymer resins may be used to form the second polymer resin foam 641 of each structural reinforcement or the same second polymer resin with different amounts of foaming agent may be used. The different second polymer resin foams 641 may exhibit different densities or different mechanical properties including compression strength and tensile strength. In additional or alternative aspects, different amounts of polymer resin may be injected into a given cavity to provide polymer resin foams of different densities.

The second polymer resin forming the second polymer resin foam 641 is introduced by a second runner 651. In aspects, the second runner system 651 is formed in the one or more fixtures 652 the component 610 is retained by. In additional or alternative aspects, the second runner system 651 is formed from tubing that is connectable to the component 610. The component 610 defines a port 657, as illustrated, or a number of ports. The port 657 is connectable to the second bladder 603 defining the second cavity 635 therein for connecting the second cavity 635 to the second runner system 651 to introduce the second polymer resin of the second polymer resin foam 641 into the second cavity 635, before or after foaming the second polymer resin. Further, the runner system 651 is connected to a second polymer resin supply 655. In aspects, the second polymer resin supply 655 includes one or more of the following: supply drums, accumulators, metering pumps, feeders, extruders, and mixers. In aspects where multiple second cavities 635 are provided and multiple second ports 657 are provided, each port may be connected by its own runner system 651 to its own polymer resin supply 655, so that each cavity 635 may be filled with different materials or filled at different rates. Further, a vent 663 is defined in the second bladder 603 and connected to the second cavity 635 to vent air out of the second cavity 635 as the second polymer resin of the second polymer resin foam 641 is being injected into the second cavity 635. It should be appreciated that in forming the first layer of structural reinforcements 642, 644, 646, the second bladder 603 blocks the port 657 and vent 663 used in forming the second layer of structural reinforcements 643 from the nearest cavity 638 used to form the first layer of structural reinforcement 646. In addition, in forming the second layer of structural reinforcements 643, the second bladder 603 blocks the ports 656, 658, 660 and vents 662, 664, 666 used in forming the first layer of structural reinforcements 642, 644, 646.

In optional aspects and as previously noted, prior to filling the second cavity 635, the second polymer resin is melted, multiple feedstock components of the second polymer resin are mixed, or the second polymer resin is melted and combined with a gas. For example, when a thermoplastic resin is used, the second polymer resin is melted through the application of heat and, in some aspects, combined with gas. In another example, when a two-component polymer resin, such as polyurethane or epoxy, is used, the resin components are mixed. Or, in alternative aspects, the second polymer resin is introduced without pre-treatment such as melting, mixing, or combining with a gas, such as in the case of a one-part polyurethane.

After filling the second cavity 635 with the second polymer resin of the second polymer resin foam 641, the second polymer resin is crosslinked or solidified in the second cavity 635. For example, where the second polymer resin is a two-component mixture, the second polymer resin may form cross-links and solidify into the second polymer resin foam 641. In other examples, the second polymer resin is heated to initiate cross-linking, or kick-off a blowing agent in a second polymer resin in a melt state or expand expandable particles in the second polymer resin in a melt state, to cause the evolution or expansion of gasses, forming the second polymer resin foam 641. When the second polymer resin of the second polymer resin foam 641 is provided as a melt, the foamed second polymer resin may cool and solidify.

With reference to FIGS. 6D and 6E, once the second polymer resin foam 641 is sufficiently solidified, at block 510 the first bladder 602 is deflated and removed from the structural component 600, which now includes the first layer of structural reinforcements 642, 644, 646 contacting the interior surface 608 of the component 610 and the second layer of the structural reinforcement 643 contained within the second bladder 603. In aspects, the first bladder 602 may be deflated by pumping the liquid out of the first bladder 602 or by simply reducing the pressure applied to the fluid 628 in the first bladder 402 by the elastic recovery of the first bladder 602 or an external source. As illustrated, the first layer of structural reinforcements 120, 122, 124 642, 644, 646 assume a variety of shapes depending on the shape of the component 112, 610 and the second bladder 603 as well as the first bladder 602. The second layer of structural reinforcements 120, 122, 124, 126, 643 assume a variety of shapes depending on the shape of the component 112, 610 and the second bladder 603. As noted above, the first and second layer of structural reinforcements 642, 643, 644, 646 define a hollow passage 130 after removal of the first bladder 603.

FIG. 6F illustrates an aspect where the second bladder 603 may include a functionalized layer at the exterior 670 of the second bladder 603. In aspects, the exterior 670 of the second bladder 603 comprises a different material from the interior layer 672 of the second bladder 603 which is connected to the first bladder 602 (not illustrated). In further aspects, the exterior 670 of the second bladder 603 includes a bonding promoter layer, such as an adhesive layer, to promote bonding between the reinforcement layers. Further, in aspects, the material selected for either the exterior layer 670 or the interior layer 672 may be selected to enhance mechanical properties, such as bending stiffness, of the in-situ sandwich structure that is created. Such arrangements provide a composite sandwich structure of the second bladder 603 and the second layer of structural reinforcements 643. In aspects, the considerations for selection of the second bladder 603 materials overlap with those for the selection of face sheets for conventional sandwich structures. Further, it should be appreciated that additional bladder layers may be provided and configured to provide additional structural reinforcement layers.

Further aspects of the process and system for forming a structural component 103 for a vehicle as set forth in FIG. 2 are described herein with reference to FIG. 7 and FIGS. 8A through 8F. The process 700 begins at block 702 by inserting an uninflated, insertable first bladder 802 including an uninflated second bladder 803 positioned within the first bladder 802 into a first hollow passage 804 defined by the interior surfaces 808 of a component 810 providing a structural component 800. The first bladder 802 includes guide wires 812, 814 removably connected to the first bladder 802 at connection points 816, 818 and extending from either side of the first bladder 802 to assist in positioning the first bladder 802 within the component 810. The guide wires 812, 814 also include attachment loops 820, 822 for securing the first bladder 802 in place to prevent movement of the first bladder 802 in the component 810 during the molding process. The attachment loops 820, 822 may be connected to the structural component 800 or to a fixture retaining the structural component 800 in place during the molding process. In aspects, the first bladder 802 is formed from silicone, polypropylene, polyamide-reinforced polypropylene, or rubber.

As with the first bladder 402, the first bladder 802 further includes restricted portions 824, which exhibit less expansion than the remainder of the first bladder 802 when the first bladder 802 is inflated. The restricted portions 824 are formed in a manner similar and of similar materials to the first bladder 402 described above. Again, while one restricted portion is illustrated, any number of restricted portions may be provided, such as one restricted portion up to ten restricted portions. Further, it should be appreciated that while restricted portions are illustrated as extending around the entire periphery of the first bladder 802, the restriction portions may be limited to segments of the bladder periphery. In addition to restricted portions, expendable portions may also be provided as described above, wherein the expandable portions exhibit greater extensibility than the rest of the bladder 802.

At block 704, and with reference to FIG. 8B, the first bladder 802 is inflated by filling the bladder 802 with a fluid 828, such as air, an inert gas, or a liquid, through a supply line 830 connected to the interior 832 of the first bladder 802. In the illustrated aspect, the first bladder 802 impinges on and contacts the interior surface 808 of the component 810 to define a one or more first cavities 834 between the interior surface 808 of the component 810 and the first bladder 802. It should be appreciated that while a single cavity is illustrated, two or more cavities may alternatively be defined. In aspects, the temperature of the fluid 828 may be regulated, such as by circulating the fluid through a chiller or a heater, to facilitate the molding of the structural reinforcements through assisting in curing or cooling the resin later introduced into first cavity 834.

After filling the bladder 802 at block 704, at block 706 and with reference to FIG. 8C the first cavity 834 is filled with a first polymer resin forming the first polymer resin foam 840, which creates the first layer of structural reinforcements 842. As in the aspects described above with reference to FIGS. 4A through 4I, the first polymer resin evolves gas to form a first polymer resin foam 840 through a chemical reaction. In alternative aspects, the first polymer resin foam 840 includes blowing agents or expandable particles, which are expanded to form a foam. In aspects, foaming may be triggered upon heating the first polymer resin. Examples of first polymer resin foams 840 include, for example, one part or two-part foams, thermoplastic materials that include expandable particles or blowing agents, or thermoplastic materials that are mixed with a gas after melting and prior to molding. First polymer resins used to form first polymer resin foams 840 include, e.g., one or more of: polyurethane, epoxy, polyisocyanurate, ethylene vinyl acetate, polyolefin, polyolefin-ethylene vinyl acetate blends, polybutylene terephthalate, polycarbonate, polyphenylene oxide, polyethylene terephthalate, and acrylonitrile butadiene styrene. As noted above, more than one first polymer resin foam 840 may be used when a given structural component 800 includes multiple structural reinforcements 842. Different first polymer resins may be used to form the first polymer resin foam 840 of each structural reinforcement or the same first polymer resin with different amounts of foaming agent may be used. The different first polymer resin foams 840 may exhibit different densities or different mechanical properties including compression strength and tensile strength.

The first polymer resin forming the first polymer resin foam 840 is introduced by a runner system 850. In aspects, the runner system 850 is formed in one or more fixtures 852 the component 810 is retained against. In other aspects, the runner system 850 is formed from tubing that is connectable to the component 810. The component 810 defines one or more ports 856 connected to the first cavity 834 and connectable to the runner system 850 for introducing the first polymer resin of the first polymer resin foam 840 into first cavity 834 before or after foaming the first polymer resin. Further, the runner system 850 is connected to a first polymer resin supply 854. In aspects, the first polymer resin supply 854 includes one or more of the following: supply drums, accumulators, metering pumps, feeders, extruders, and mixers. As previously noted, each cavity 834, when more than one cavity is provided, can be supplied by its own runner system 850 and its own polymer resin supply system 854. Further, vent 862 is defined in component 810 and connected to the first cavity 834 to vent air out of the first cavity 834 as the first polymer resin of the first polymer resin foam 840 is being injected into the first cavity 834.

In optional aspects, prior to filling the first cavity 834, the first polymer resin is melted, multiple feedstock components of the first polymer resin are mixed, or the first polymer resin is melted and combined with a gas. For example, when a thermoplastic resin is used, the first polymer resin is melted through the application of heat and, in some aspects, combined with gas. In another example, when a two-component polymer resin, such as polyurethane or epoxy, is used, the resin components are mixed. Or, in alternative aspects, the first polymer resin is introduced without pre-treatment such as melting, mixing, or combining with a gas, such as in the case of a one-part polyurethane.

After filling the first cavity 834 with the first polymer resin of the first polymer resin foam 840, the first polymer resin is crosslinked or solidified in the first cavity 834. For example, where the first polymer resin is a two-component mixture, the first polymer resin may form cross-links and solidify into the first polymer resin foam 840. In other examples, the first polymer resin is heated to initiate cross-linking, or kick-off a blowing agent in a first polymer resin in a melt state or expand expandable particles in the first polymer resin in a melt state, to cause the evolution or expansion of gasses, forming the first polymer resin foam 840. When the first polymer resin of the first polymer resin foam 840 is provided as a melt, the foamed first polymer resin may cool and solidify. It should be appreciated that the first polymer resin does not need to be completely crosslinked or completely cooled to ambient temperature but crosslinked sufficiently or cooled sufficiently so that the structural reinforcements 842 resist deformation.

With reference to FIG. 8D, once the first polymer resin foam 840 is sufficiently solidified, at block 708 the process of forming another layer of structural reinforcements begins by filling the second bladder 803 with a second polymer resin for forming a second polymer resin foam 841. The second polymer resin foam 841 creates the second layer of structural reinforcements 843.

Figure 8E:
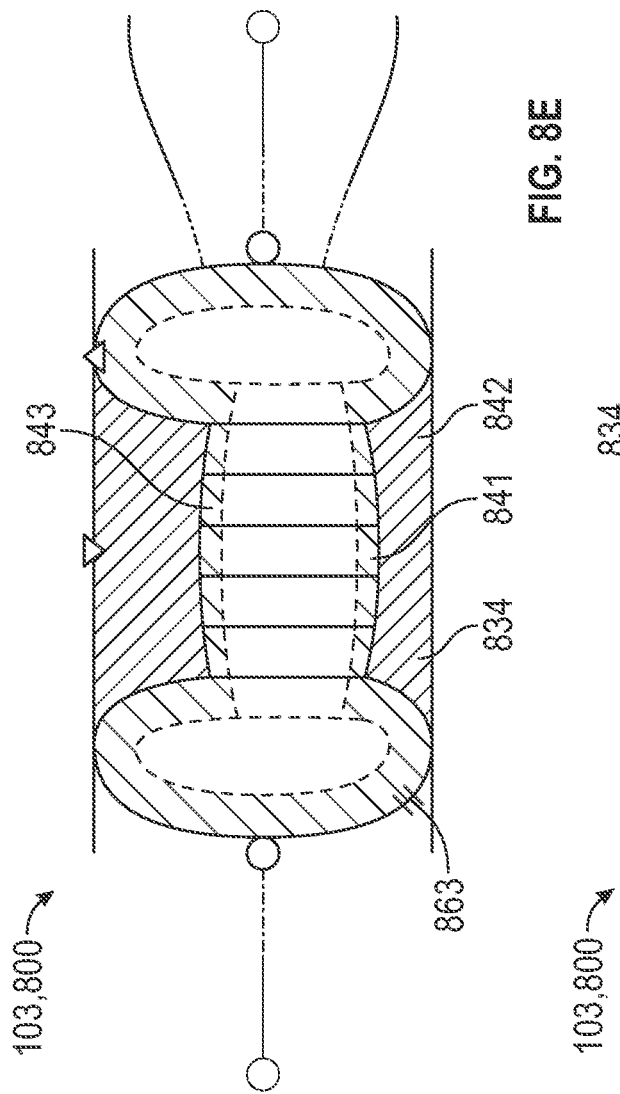
FIG. 8E illustrates the introduction of a second polymer resin foam between the first bladder and second bladder, according to an embodiment of the present disclosure.
Figure 8F:
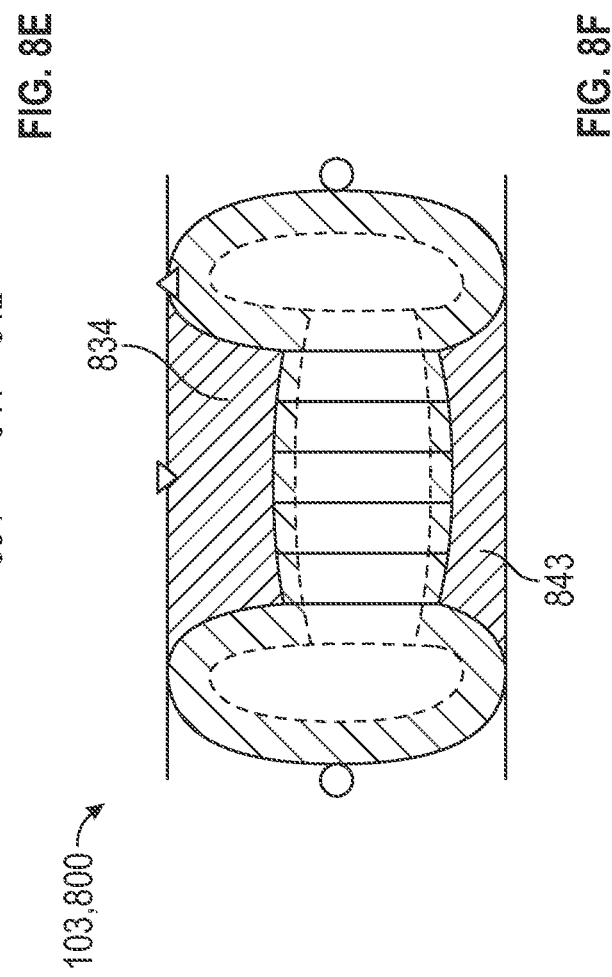
FIG. 8F illustrates the removal of guidewires from the first bladder, according to an embodiment of the present disclosure.
Figure 9A:
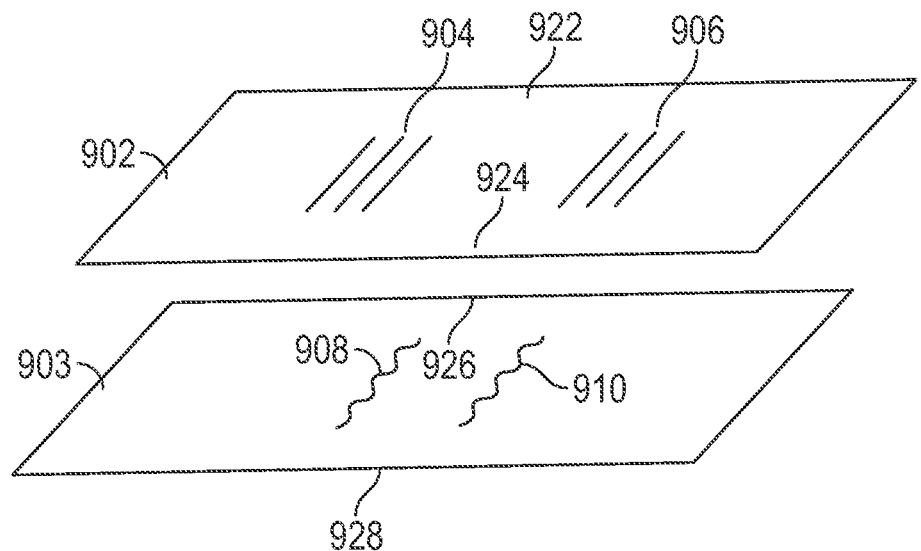
FIG. 9A illustrates a lay-up for the bladder for use in FIGS. 8A through 8F, according to an embodiment of the present disclosure.
Figure 9B:
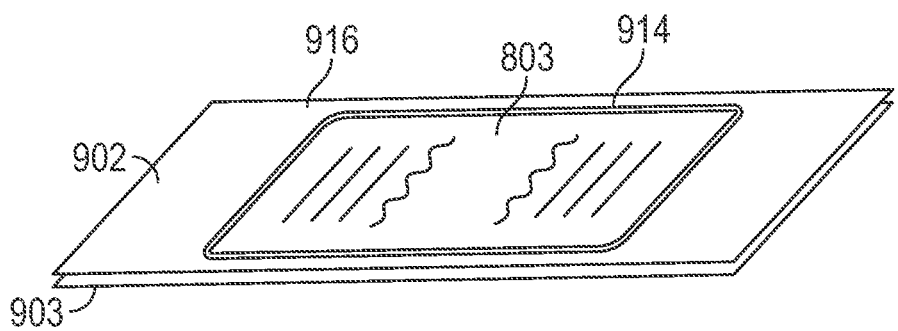
FIG. 9B illustrates the lay-up for the bladder of FIG. 9A after sealing, according to an embodiment of the present disclosure.
Figure 9C:
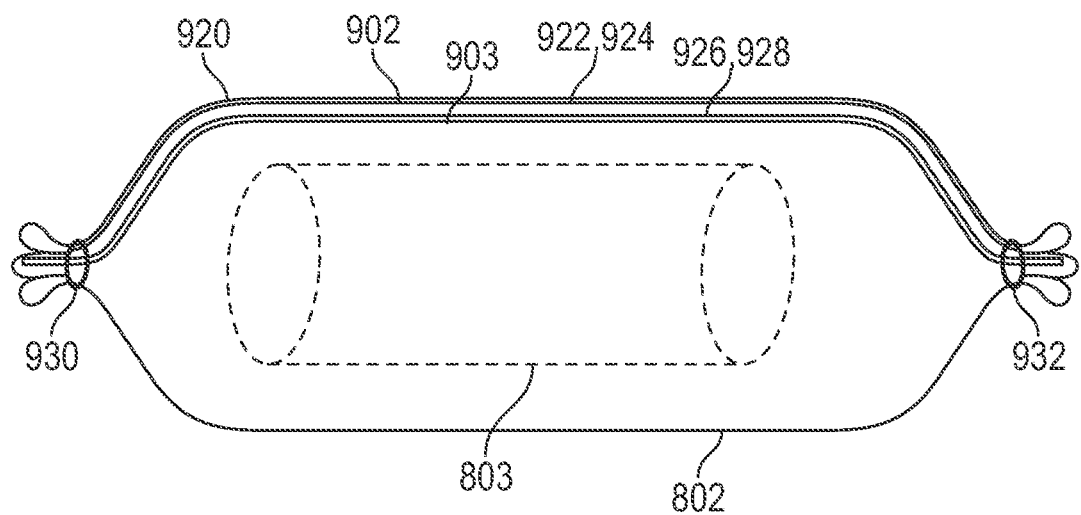
FIG. 9C illustrates the lay-up for the bladder of FIG. 9A, rolled and cinched at the ends and including the supply lines, according to an embodiment of the present disclosure.

FIGS. 9A through 9C illustrate the construction of the first bladder 802 and second bladder 803 of FIGS. 8A through 8F. In aspects, the second bladder 803 is formed from silicone, polypropylene, polyamide-reinforced polypropylene, or rubber. Like the first bladder 802, the second bladder 803 may include one or more restricted portions. One or more expendable portions may also be provided. In the illustrated aspect, the second bladder 803 is located within the first bladder 802 to define a second cavity 835 between the first bladder 802 and the second bladder 803. It should be appreciated that while a single second cavity 835 is illustrated, multiple cavities may be defined. In aspects, fluid 828 supplied to the first bladder 802 may be used to regulate the temperature of the polymer resin in the second bladder 803, such as by circulating the fluid 828 through a chiller or a heater, to facilitate the molding of the structural reinforcements through assisting in curing or cooling the resin later introduced into second cavity 835.

As with the first layer of structural reinforcements 842, in aspects, the second polymer resin evolves gas to form a second polymer resin foam 841 through a chemical reaction. In alternative aspects, the second polymer resin foam 841 includes blowing agents or expandable particles, which are expanded to form a foam. In aspects, foaming may be triggered upon heating the second polymer resin. Examples of second polymer resin foams 841 include, for example, one part or two-part foams, thermoplastic materials that include expandable particles or blowing agents, or thermoplastic materials that are mixed with a gas after melting and prior to molding. Second polymer resins used to form second polymer resin foams 841 include, e.g., one or more of: polyurethane, epoxy, polyisocyanurate, ethylene vinyl acetate, polyolefin, polyolefin-ethylene vinyl acetate blends, polybutylene terephthalate, polycarbonate, polyphenylene oxide, polyethylene terephthalate, and acrylonitrile butadiene styrene. As noted above, more than one second polymer resin foam 841 may be used when a given structural component 800 includes multiple structural reinforcements. Different second polymer resins may be used to form the second polymer resin foam 841 of each structural reinforcement or the same second polymer resin with different amounts of foaming agent may be used. The different second polymer resin foams 841 may exhibit different densities or different mechanical properties including compression strength and tensile strength. In additional or alternative aspects, different amounts of polymer resin may be injected into a given cavity to provide polymer resin foams of different densities.

The second polymer resin forming the second polymer resin foam 841 is introduced by a second runner 851. In aspects, the second runner system 851 is formed in the one or more fixtures 852 the component 810 is retained against. In other aspects, the second runner system 851 is formed from tubing that is connectable to the component 810. The component 810 defines a port 857, as illustrated, or multiple ports connected to the first bladder 801 and second cavity 835, connecting the second cavity 835 to the runner system 851 for introducing the second polymer resin of the second polymer resin foam 841 into the second cavity 835, before or after foaming the second polymer resin. Further, the runner system 851 is connected to a second polymer resin supply 855. In aspects, the second polymer resin supply 855 includes one or more of the following: supply drums, accumulators, metering pumps, feeders, extruders, and mixers. In additional or alternative aspects, a second runner system 831 may be provided and connected directly to the first bladder 802 and second cavity 835. Further, in aspects, a vent 863 may be defined in the first bladder 802 and opened while molding the second layer of structural reinforcements 842 to the second layer second cavity 835 to vent air out of the second cavity 835 as the second polymer resin of the second polymer resin foam 841 is being injected into the second cavity 835. It should be appreciated that in forming the first layer of structural reinforcements 842, the first bladder 802 blocks the port 857 and vent 863 used in forming the second layer of structural reinforcements 843. In addition, in forming the second layer of structural reinforcements 843, the second bladder 803 blocks the port 856 and vent 862 used in forming the first layer of structural reinforcements 842.

In optional aspects, prior to filling the second cavity 835, the second polymer resin is melted, multiple feedstock components of the second polymer resin are mixed, or the second polymer resin is melted and combined with a gas. For example, when a thermoplastic resin is used, the second polymer resin is melted through the application of heat and, in some aspects, combined with gas. In another example, when a two-component polymer resin, such as polyurethane or epoxy, is used, the resin components are mixed. Or, in alternative aspects, the second polymer resin is introduced without pre-treatment such as melting, mixing, or combining with a gas, such as in the case of a one-part polyurethane.

After filling the second cavity 835 with the second polymer resin of the second polymer resin foam 841, the second polymer resin is crosslinked or solidified in the second cavity 835. For example, where the second polymer resin is a two-component mixture, the second polymer resin may form cross-links and solidify into the second polymer resin foam 841. In other examples, the second polymer resin is heated to initiate cross-linking, or kick-off a blowing agent in a second polymer resin in a melt state or expand expandable particles in the second polymer resin in a melt state, to cause the evolution or expansion of gasses, forming the second polymer resin foam 841. When the second polymer resin of the second polymer resin foam 841 is provided as a melt, the foamed second polymer resin may cool and solidify. It should be appreciated that the second polymer resin does not need to be completely crosslinked or completely cooled to ambient temperature but crosslinked sufficiently or cooled sufficiently so that the second layer of structural reinforcement 843 resists deformation upon removal of the second bladder 803. Additional structural reinforcement layers may be formed by adding layers to the first bladder 802.

With reference to FIGS. 8E and 8F, once the second polymer resin foam 841 is sufficiently solidified, at block 710 the wire guides 812, 814 are detached from the first bladder 802 at the attachment points 816, 818. As illustrated, the second layer of structural reinforcements 120, 122, 124, 126, 843 assume a variety of shapes depending on the shape of the first bladder 801 and the second bladder 803. In this aspect, the first bladder 802 and second bladder 803 remain in the structural component 800 and contribute to the first structural reinforcement layer 834 and second structural reinforcement layer 843.

FIGS. 9A through 9C illustrate the construction of the first and second bladders 802, 803 for use with reference to FIGS. 8A through 8F. The first and second bladders 802, 803 may be formed of a first layer 902 and a second layer 903 of bladder material, wherein each layer may be formed from the same or different bladder materials from those described above. As illustrated, each layer 902, 903 may include restricted regions 904, 906, 908, 910 to reduce inflation of the first and second bladders 802, 803 in these regions. Additionally, or alternatively, expandable regions may be provided in either layer 902, 903. As illustrated in FIG. 9A, the first layer 902 and second layer 903 are stacked and are coextensive. However, in some aspects, the second layer 903 may be smaller in size than the first layer. As illustrated in FIG. 9B, the first layer 902 and second layer 903 are affixed together, forming the second bladder 803 between the first layer 902 and the second layer 903. In the illustrated example, the first layer 902 and second layer 903 are bonded together by heat sealing or an adhesive to form an enclosed region 914 within the periphery 916 of the first layer 902. In alternative aspects, multiple enclosed regions 914 may be formed to form multiple second cavities 835 between the first bladder 802 and second bladder 803. The first bladder 802 is then formed by rolling the first layer 902 and second layer 903 into a tube 920 and sealing the longitudinal edges 922, 924 of the first layer 902 together. In further aspects, such as where the second layer 903 is coextensive with the first layer 902, the longitudinal edges 926, 928 of the second layer 903 are also sealed with the longitudinal edges 922, 924 of the first layer 902. In some aspects, the longitudinal edges 922, 924, 926, 928 overlap and are sealed together in an overlapping manner. As illustrated in FIG. 9C, the ends 930, 932 of at least the first layer 902, and in aspects, the second layer 903, are cinched together and sealed, thus forming the first bladder 802 and the second bladder 803. The first port 856 and second port 857 for receiving the polymer resin may be formed at any time during the process of forming the first bladder 082 and second bladder 803.

As described further above with reference to FIGS. 1B and 1C, in the above aspects illustrated in FIGS. 1 through 8F, the first layer of structural reinforcements 132, 442, 444, 446, 642, 644, 646, 842 only partially fill a given cross-section of the first hollow passage 116, 404, 606, 804 defined by the structural component 103, 400, 600, 800. Further, the second reinforcement layers 134, 443, 643, 843 also only partially fill a given-cross section of the first hollow passage 116, 404, 606, 804 defined by the structural component 103, 400, 600, 800 as well as the second hollow passages defined by the first layer of structural reinforcements 132, 442, 444, 446, 642, 644, 646, 842.

While the process described herein is described with relation to B-pillar, it should be appreciated that the process may be used to incorporate structural reinforcements in other structural components that include or define hollow passages. Structural components include components that perform at least one of the following functions: support vehicle weight, absorb road shock, and manage collision energy. Structural components include, e.g., the various pillars (A, B, C, D) as noted above, radiator core support, front and rear bumper reinforcements, cross-members, seat frames, front, and rear door intrusion beams, etc. Further, it should be appreciated that the method used herein may be used for depositing materials in hollow passages defined by other vehicle components, such as within air ducts.

The structural components including the structural reinforcements and method of forming the structural components including the structural reinforcements offer several advantages. As compared to molding methods that require free-rise and complete fill of the structural reinforcement in the structural component, the advantages include, for example, the ability to form multiple structural reinforcements in the structural component at a single time. This results in a reduction in cycle time to form a structural component including more multiple structural reinforcements, requiring multiple filling stations. Advantages further includes a reduction in weight due to the ability to partially fill of the structural reinforcement in the structural component. This results in a reduction in weight of the structural component, contributing to weight reductions in the vehicle.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A process of forming a structural component for a vehicle, comprising:
    forming a first cavity in a first hollow passage between a first bladder and an interior surface of a component;
    forming a first structural reinforcement layer in the first cavity by filling the first cavity with a first polymer resin;
    foaming the first polymer resin to form a first polymer resin foam;
    forming a second cavity in the first hollow passage;
    forming a second structural reinforcement layer in the second cavity by filling the second cavity with a second polymer resin; and
    foaming the second polymer resin to form a second polymer resin foam.

2. The process of claim 1, wherein the first polymer resin foam and the second polymer resin foam partially fill the first hollow passage.

3. The process of claim 1, further comprising inflating the first bladder with a first fluid.

4. The process of claim 1, further comprising removing the first bladder from the first hollow passage after forming the first polymer resin foam.

5. The process of claim 4, further comprising inserting and inflating a second bladder into the first hollow passage after removing the first bladder from the first hollow passage, wherein the second cavity is formed between the second bladder and the first structural reinforcement layer.

6. The process of claim 5, wherein the second cavity is formed between the second bladder, the first structural reinforcement layer, and the interior surface of the component.

7. The process of claim 5, further comprising removing the second bladder.

8. The process of claim 1, wherein a second bladder is connected to an exterior surface of the first bladder and the second cavity is present when the first bladder is inflated.

9. The process of claim 8, further comprising adhering an exterior surface of the second bladder to the first structural reinforcement layer.

10. The process of claim 9, further comprising removing the first bladder after filling the second cavity with the second polymer resin.

11. The process of claim 1, further comprising forming the second cavity between the first bladder and a second bladder located within the first bladder.

12. The process of claim 11, further comprising disconnecting a first supply line and a second supply line from the first bladder and the second bladder.

13. A system for forming a multilayer structural component for a vehicle, comprising:
    a component including a first hollow passage defined by an interior surface of the component;
    a first inflatable bladder insertable into the first hollow passage of the component, wherein the first inflatable bladder and the interior surface of the component define a first cavity within the first hollow passage;
    a first foamable polymer resin for forming a first structural reinforcement layer in the first cavity;
    a second inflatable bladder insertable into the first hollow passage and through the first structural reinforcement layer, wherein the second inflatable bladder defines a second cavity within the first hollow passage; and
    a second foamable polymer resin for forming a structural reinforcement layer on the first structural reinforcement layer in the second cavity.

14. The system of claim 13, further comprising a first runner system connected to the first cavity by a first port defined in the component.

15. The system of claim 13, further comprising a second runner system connected to the second cavity by a second port defined in the component.

16. The system of claim 13, wherein the second inflatable bladder is affixed to the first inflatable bladder.

17. The system of claim 13, wherein the second inflatable bladder is connected to an exterior surface of the first inflatable bladder.

18. The system of claim 17, wherein the second inflatable bladder includes a bonding promoter layer.

19. A structural component for a vehicle, comprising:
    a component including an interior surface defining a first hollow passage;
    a first structural reinforcement contacting the interior surface of the component, the first structural reinforcement formed of a first polymer resin foam; and
    a second structural reinforcement contacting the first structural reinforcement, the second structural reinforcement formed of a second polymer resin foam,
    wherein the first structural reinforcement and the second structural reinforcement form a multilayer structural reinforcement, and the component defines a cross-section and the multilayer structural reinforcement partially fills the cross-section.

20. The structural component for a vehicle of claim 19, wherein a bonding promoter layer positioned between the first structural reinforcement and the second structural reinforcement.

* * * * *